(12) United States Patent
Tian et al.

(10) Patent No.: US 12,432,711 B2
(45) Date of Patent: Sep. 30, 2025

(54) NETWORK INITIATED POLLING FOR UPLINK SCHEDULING REQUEST

(71) Applicant: QUALCOMM Incorporated, San Diego, CA (US)

(72) Inventors: Qingjiang Tian, San Diego, CA (US); Jing Sun, San Diego, CA (US); Xiaoxia Zhang, San Diego, CA (US); Zhifei Fan, San Diego, CA (US); Wooseok Nam, San Diego, CA (US); Ahmed Abdelaziz Ibrahim Abdelaziz Zewail, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 751 days.

(21) Appl. No.: 17/652,232

(22) Filed: Feb. 23, 2022

(65) Prior Publication Data
US 2022/0330271 A1    Oct. 13, 2022

Related U.S. Application Data

(60) Provisional application No. 63/174,329, filed on Apr. 13, 2021.

(51) Int. Cl.
*H04W 72/12* (2023.01)
*H04W 72/1268* (2023.01)
*H04L 1/1812* (2023.01)

(52) U.S. Cl.
CPC ....... *H04W 72/12* (2013.01); *H04W 72/1268* (2013.01); *H04L 1/1812* (2013.01)

(58) Field of Classification Search
CPC . H04W 72/12; H04W 72/1268; H04W 72/23; H04W 74/06; H04L 1/1812; H04L 5/0053; H04L 5/0094; H04L 1/1685; H04L 1/1822; H04L 1/1861; H04L 5/0055; H04L 1/1671; H04B 7/0617
See application file for complete search history.

(56) References Cited

U.S. PATENT DOCUMENTS

| | | | |
|---|---|---|---|
| 2018/0139764 A1* | 5/2018 | Hwang | H04W 72/0446 |
| 2019/0246416 A1* | 8/2019 | Park | H04W 72/21 |
| 2019/0306875 A1* | 10/2019 | Zhou | H04W 72/20 |
| 2020/0228248 A1* | 7/2020 | Islam | H04L 5/0055 |
| 2020/0374085 A1* | 11/2020 | Yin | H04L 1/1671 |
| 2021/0234640 A1* | 7/2021 | Cirik | H04L 1/1854 |
| 2022/0007399 A1* | 1/2022 | Rastegardoost | H04L 1/1854 |

(Continued)

*Primary Examiner* — Michael K Phillips
(74) *Attorney, Agent, or Firm* — Procopio, Cory, Hargreaves & Savitch LLP

(57) ABSTRACT

Aspects of methods, computer-readable mediums, and apparatuses are provided for a user equipment (UE) or a base station. The UE receives, from a base station, an indication to transmit a scheduling request (SR). The UE receives a downlink transmission triggering hybrid automatic repeat request (HARQ) feedback in one or more physical uplink control channel (PUCCH) resources. The UE transmits the SR to the base station in the one or more PUCCH resources for the HARQ feedback. The base station transmits, to a UE, an indication to transmit an SR. The base station transmits a downlink transmission triggering HARQ feedback in one or more PUCCH resources. The base station receives the SR from the UE in the one or more PUCCH resources.

30 Claims, 13 Drawing Sheets

(56) References Cited

U.S. PATENT DOCUMENTS

| | | | |
|---|---|---|---|
| 2022/0053522 A1* | 2/2022 | MolavianJazi | H04L 27/26025 |
| 2022/0407673 A1* | 12/2022 | Löfving | H04L 5/1469 |
| 2023/0097142 A1* | 3/2023 | Alfarhan | H04B 17/318 |
| | | | 370/329 |
| 2023/0379962 A1* | 11/2023 | Andersson | H04W 72/21 |
| 2024/0089062 A1* | 3/2024 | Lin | H04W 72/21 |
| 2024/0146466 A1* | 5/2024 | Yin | H04L 1/1671 |

* cited by examiner

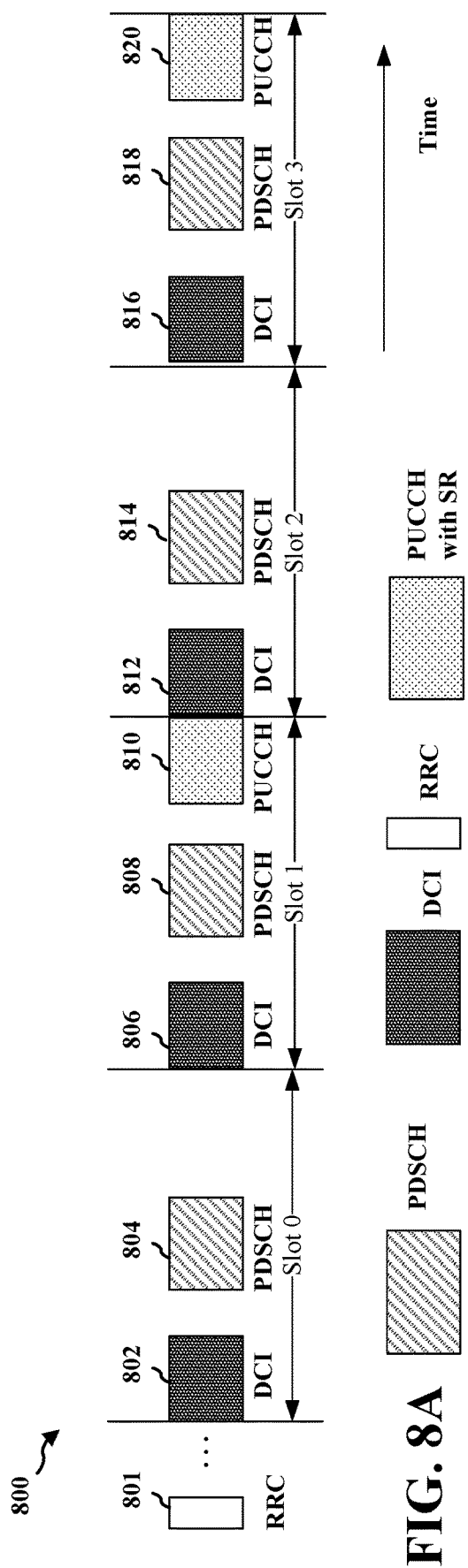
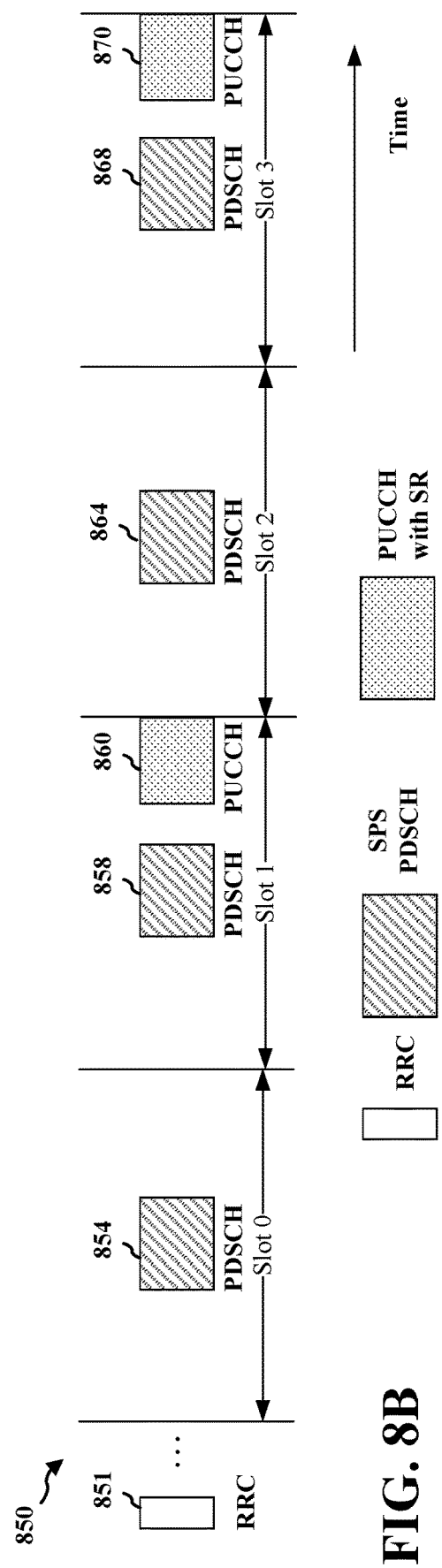
FIG. 8A
FIG. 8B

NETWORK INITIATED POLLING FOR UPLINK SCHEDULING REQUEST

CROSS REFERENCE TO RELATED APPLICATION(S)

This application claims the benefit of and priority to U.S. Provisional Application Ser. No. 63/174,329, entitled "Base Station Initiated Polling for Uplink Scheduling Request" and filed on Apr. 13, 2021, which is expressly incorporated by reference herein in its entirety.

TECHNICAL FIELD

The present disclosure relates generally to communication systems, and more particularly, to wireless communication including a scheduling request.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. In some aspects, the apparatus may be a user equipment (UE) or a component of a UE. The apparatus receives, from a base station, an indication to transmit a scheduling request (SR). The apparatus receives a downlink transmission triggering hybrid automatic repeat request (HARQ) feedback in one or more physical uplink control channel (PUCCH) resources. The apparatus transmits the SR to the base station in the one or more PUCCH resources for the HARQ feedback.

In an aspect of the disclosure, a method, a computer-readable medium, and an apparatus are provided for wireless communication at a network node. In some aspects, the apparatus may be a base station or a component of a base station. The apparatus sends an indication for a UE to transmit an SR. The apparatus sends a downlink transmission triggering HARQ feedback in one or more PUCCH resources. The apparatus receives the SR for the UE in the one or more PUCCH resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 8A and 8B illustrate time diagrams showing example aspects of SR transmission based on polling from a base station.

DETAILED DESCRIPTION

Figure 1:
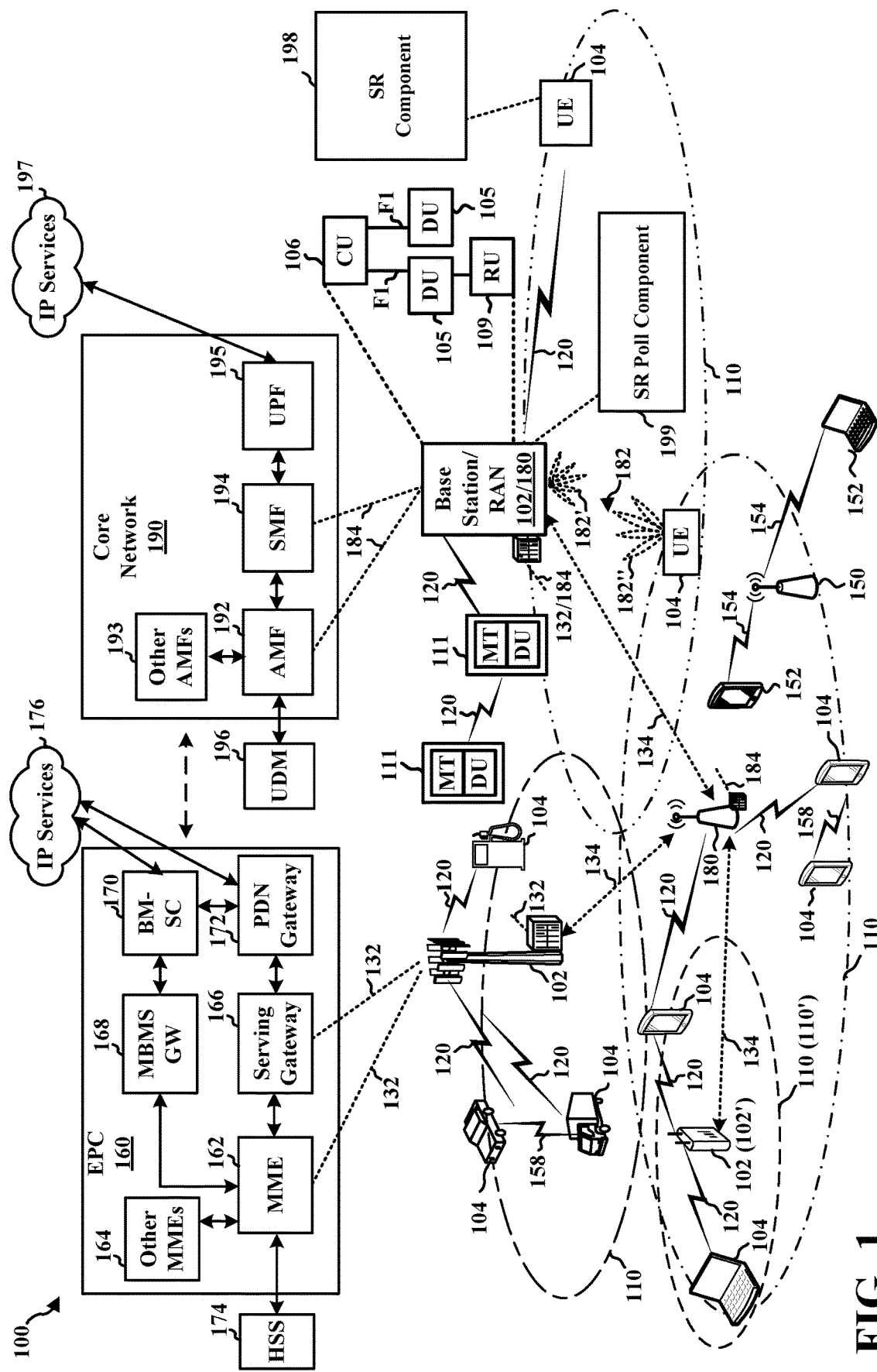
FIG. 1 is a diagram illustrating an example of a wireless communications system and an access network.

A UE may receive a configuration that provides the UE with periodic opportunities to transmit a scheduling request (SR) requesting uplink resources to transmit uplink data for a logical channel. If the UE has data to transmit for the logical channel, e.g., a non-empty uplink buffer, the UE may transmit an SR in a periodic opportunity. The base station may monitor the periodic opportunities to determine whether the UE sends a SR. If the UE transmits an SR, the base station may provide a grant of resources for the uplink transmission. If the UE does not indicate uplink data for transmission, the base station may wait until the next periodic occasion to monitor for an SR from the UE. The base station and UE may use beamforming, e.g. in connection with a higher carrier frequency such as mmW. In order to monitor for the SR at the periodic opportunity, the base station tunes to a reception beam associated with the UE. In some aspects, tuning to the beam to monitor for the SR may limit the base station's ability to perform other operations and/or to monitor other directions or beams.

Aspects presented herein provide a mechanism for opportunistic SR polling, e.g., non-periodic SR polling, that enables the base station more dynamic control over the manner in which the base station monitors for SR from a UE. The added control may enable the base station to employ more efficient spatial sweeping for SR detection, more flexible resource scheduling, or better latency control.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 including base stations 102 or 180 and UEs 104. In some aspects, a base station 102 or 180, or a component of a base station, may include an SR poll component 199 configured to send, to a UE 104, an indication to transmit an SR for one or more logical channels of the UE 104. The base station 102 or 180, or a component of a base station, may then send a downlink transmission triggering HARQ feedback in one or more PUCCH resources and may receive the SR together with the HARQ feedback from the UE in the one or more PUCCH resources. In some aspects, one or more of the UEs 104 may include an SR component 198 that is configured to receive an indication to transmit a SR. The UE may receive a downlink transmission triggering HARQ feedback in one or more PUCCH resources. The SR component 198 may be further configured to transmit the SR together with the HARQ feedback to the base station 102 or 180 in the one or more PUCCH resources for the HARQ feedback. Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2(52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2B:
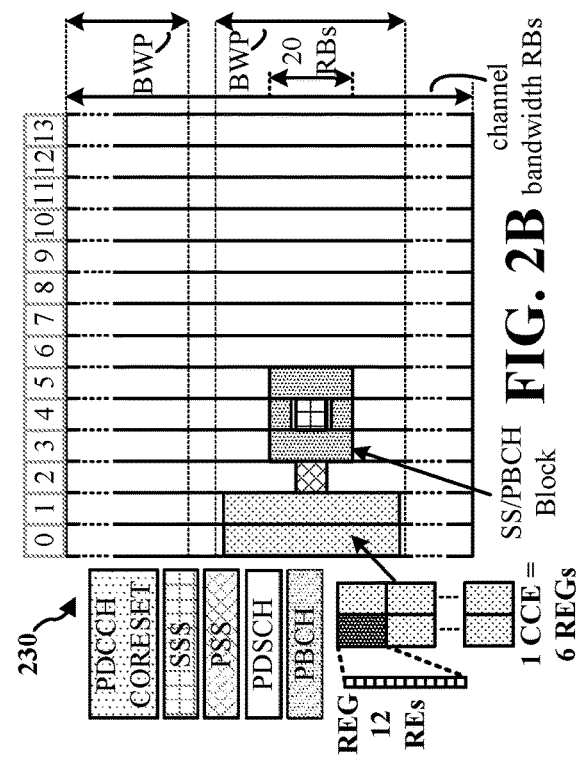
FIG. 2B is a diagram illustrating an example of DL channels within a subframe, in accordance with various aspects of the present disclosure.
Figure 2D:
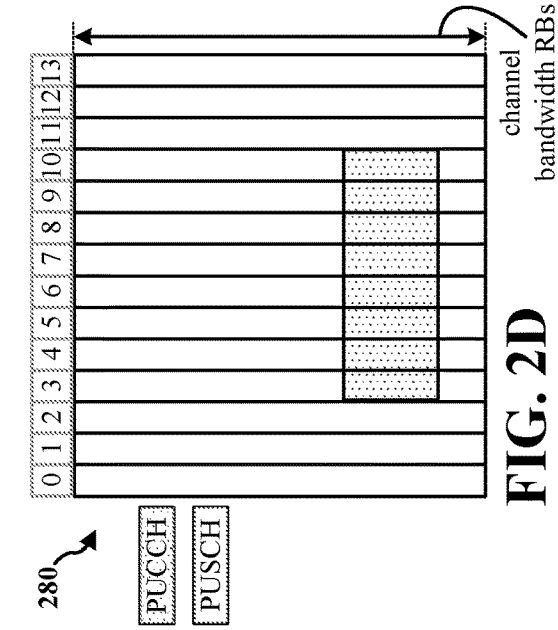
FIG. 2D is a diagram illustrating an example of UL channels within a subframe, in accordance with various aspects of the present disclosure.
Figure 2A:
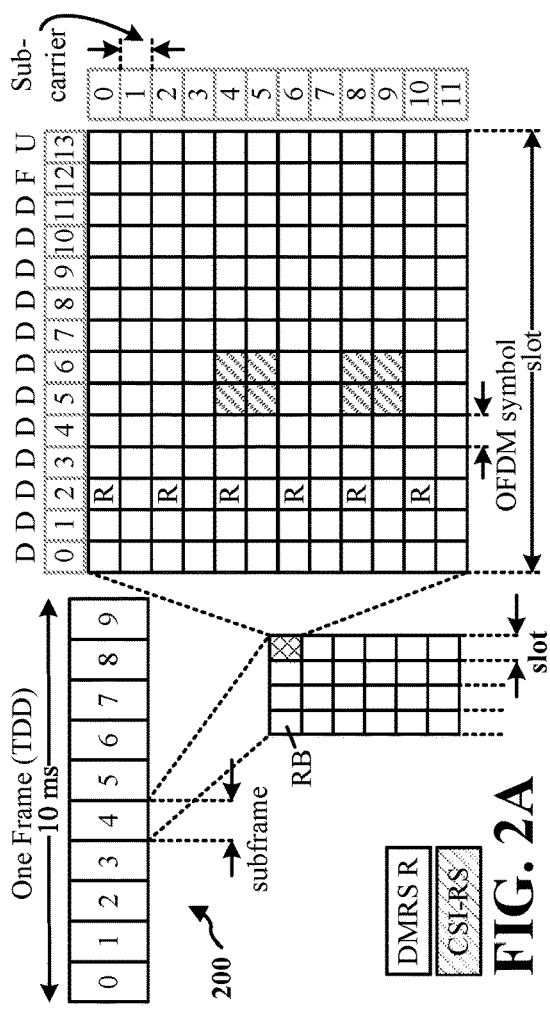
FIG. 2A is a diagram illustrating an example of a first frame, in accordance with various aspects of the present disclosure.
Figure 2C:
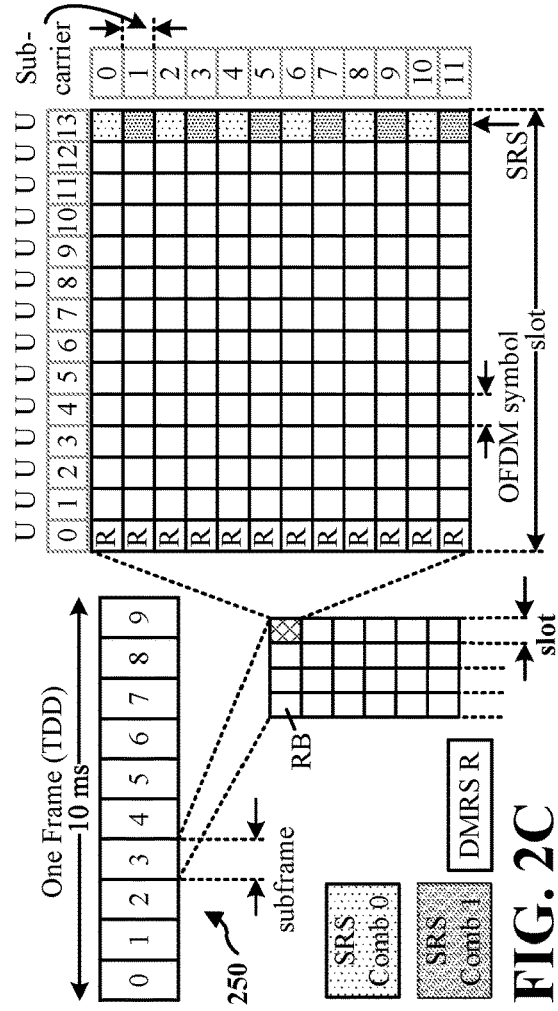
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description herein applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
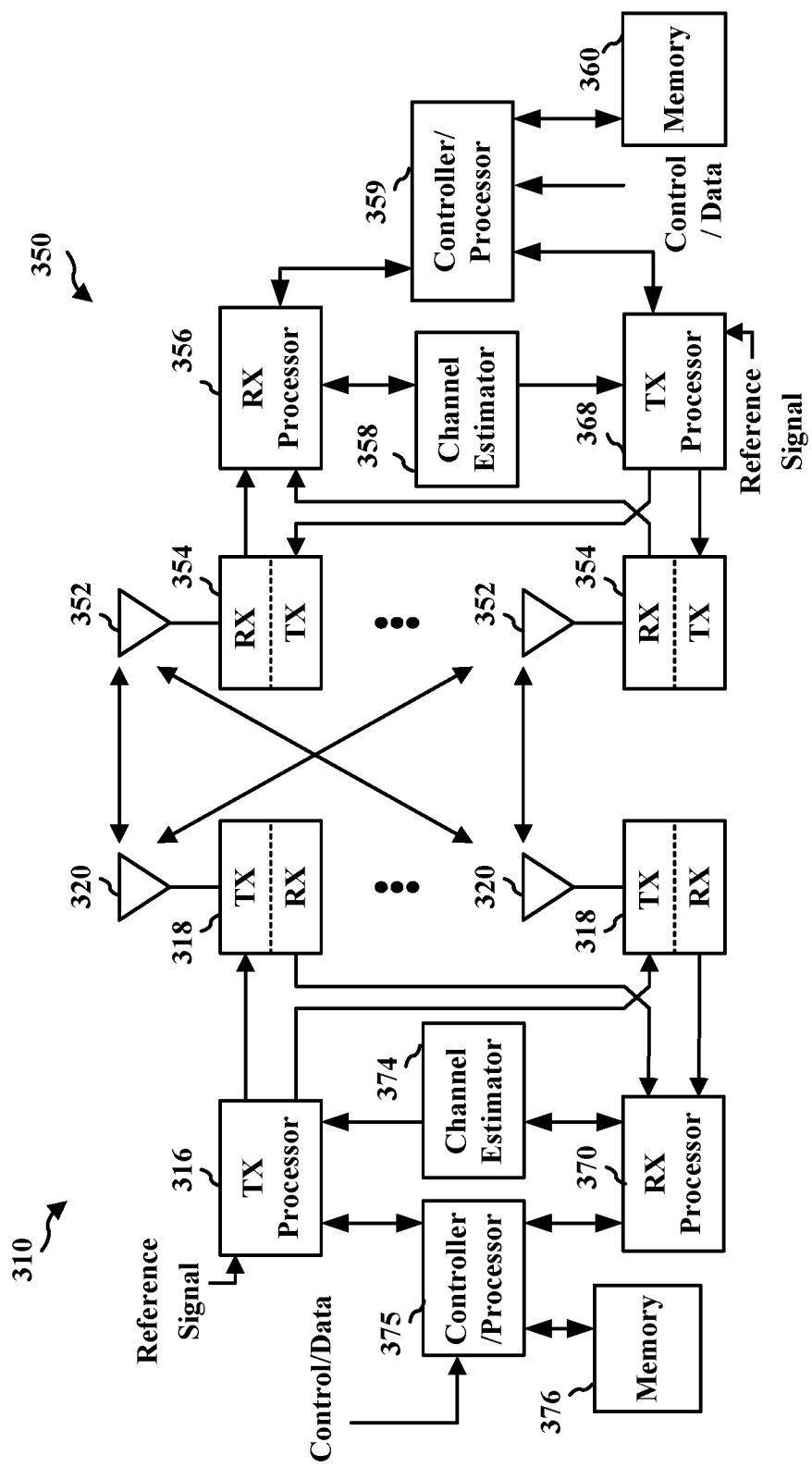
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the SR component 198 of FIG. 1.

At least one of the TX processor 316, the RX processor 370, and the controller/processor 375 may be configured to perform aspects in connection with an SR poll component 199 of FIG. 1.

Figure 4:
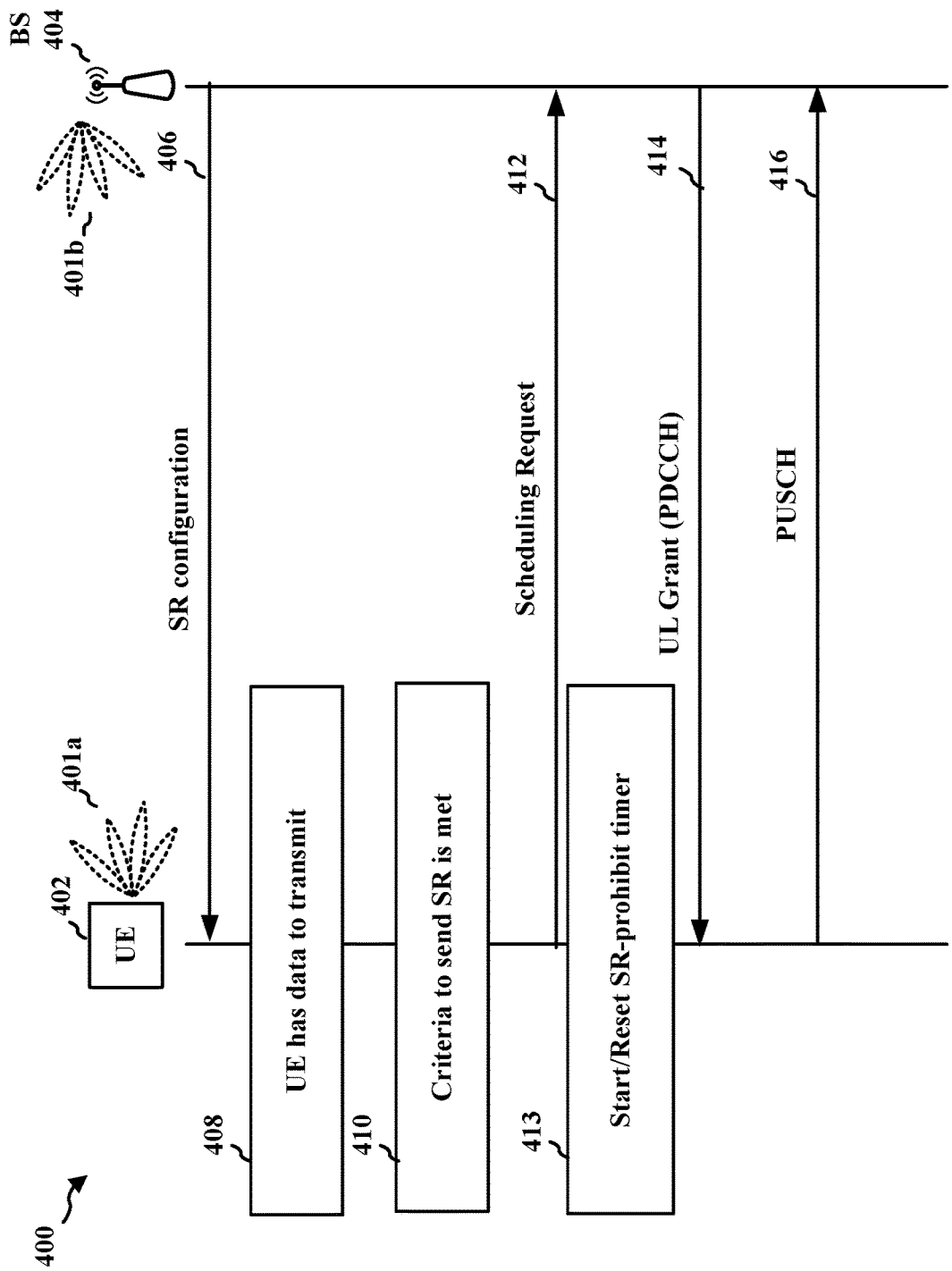
FIG. 4 illustrates a communication flow showing example aspects of SR transmission.

When a UE has data from a logical channel to transmit, the UE may request a grant of uplink resources to transmit the data to the network. FIG. 4 illustrates an example communication flow 400 between a UE 402 and a base station 404 including a scheduling request (SR) from the UE 402. At 408, the UE may determine that it has data for transmission. In response to the arrival or presence of data for transmission, the UE 402 may determine whether the UE is able to send an SR at a particular time. For example, the UE 402 may determine whether one or more SR criteria is met. The criteria may be based on a configuration from the base station 404. For example, at 406, the UE 402 may receive a configuration 406 or one or more parameters for SR transmission for a logical channel of the UE 402. The configuration may indicate a corresponding logical channel to which the scheduling request configuration corresponds. The configuration 406 may be received in one or more RRC messages, in some aspects. The base station 404 may configure a PUCCH resource for the SR, a periodicity and/or offset (e.g., which may be referred to as a periodicityAndOffset), a minimum time interval between SRs (e.g., which may be referred to as an sr-prohibit timer), etc. Thus, as one example of criteria, the UE may determine whether a minimum timer interval has passed since a last SR transmission from the UE, e.g., whether a timer such as the sr-ProhibitTimer has expired. The timer may reset after the UE transmits a positive SR on the PUCCH. An SR only PUCCH may refer to a PUCCH that is transmitted to include the SR without including additional UCI. In some aspects, the timer may reset based on the UE transmitting a positive SR indicating that the UE has data to transmit or is requesting resources for a data transmission. If a UE does not have data to transmit in the logical channel, the UE may skip transmitting the SR. In some aspects, the UE may transmit a negative SR indicating that the UE does not have data to transmit when UE needs to multiplex the SR with some other UCIs in a same PUCCH. The UE may reset the timer based on a positive SR and may not reset the timer based on a negative SR.

Upon determining that the SR criteria is met, at 410, the UE transmits the SR 412 to the base station 404. In some aspects, the UE may indicate a positive SR by sending a particular sequence, e.g., to transmit an SR in a PUCCH comprising the SR and without other UCI. As an example, the UE sequence may have a length of 12 and may use one RB/12 REs. In some examples, the SR may comprise a bit when the SR is multiplexed with one or more other UCIs using a PUCCH resource. For example, after timer configured for a logical channel expires, the UE may send a positive SR 412 using the PUCCH resource, if UE has data for that logical channel. If the UE does not have data, the UE may skip transmission of the SR, in some aspects. In other aspects, the UE may transmit a negative SR multiplexing with some other UCIs in the PUCCH resource indicating to the base station that the UE does not have data for transmission.

The base station 404 may respond by transmitting an uplink grant 414 to the UE 402 scheduling resources for the UE 402 to transmit the data. The uplink grant may be transmitted in PDCCH, for example. The UE 402 may use the scheduled resources to transmit the data, e.g., in a PUSCH transmission 416.

When the UE 402 transmits the SR, at 412, the UE may start/reset, at 413, a timer associated with a minimum interval between SR requests, e.g., the SR-prohibit timer.

FIG. 4 illustrates that the wireless communication between the UE 402 and the base station 404 may be based on beams 401*a* and 401*b*. Beamforming may be used to compensate for path loss and shorter ranges in higher carrier frequencies, such as a mmW frequency band. The base station 404 and the UE 402 may each include a plurality of antennas, such as antenna elements, antenna panels, and/or antenna arrays to facilitate the beamforming.

The base station 404 may transmit a beamformed signal to the UE 402 in one or more transmit directions. The UE 402 may receive the beamformed signal from the base station 404 in one or more receive directions. The UE 402 may also transmit a beamformed signal to the base station 404 in one or more transmit directions. The base station 404 may receive the beamformed signal from the UE 402 in one or more receive directions. The base station 404 and the UE 402 may tune their Tx/Rx beams for communication between the UE and the base station.

The base station may not be able to receive/monitor for transmissions in more than one direction, e.g., one active beam, at a time due to analog beamforming. In other aspects, the base station may be limited to reception/monitoring on a subset of beams at a time. In the SR process described in connection with FIG. 4, the base station 404 may periodically tune its beam toward the UE 402 in order to listen or monitor for a possible SR transmission from the UE 402. The SR configuration may provide periodic opportunities for the UE to transmit the SR, and the base station 404 may monitor each of the periodic opportunities to determine whether the UE has data for transmission. The UE may or may not transmit the SR in a PUCCH resource. At times, the base station may have other operations to perform during the periodic time that it tunes to monitor for the SR from the UE, which the base station may delay or drop. If the UE does not transmit the SR in the periodic opportunity, the periodic tuning to listen for the SR may be less effective for the base station. The periodic listening may limit the flexibility of the base station and may place an operation cost on the network.

In some aspects the base station may poll a UE for an uplink SR rather than periodically monitoring PUCCH resources for a potential uplink SR from the UE. The base station may use polling with multiple UEs rather than periodically monitoring PUCCH resources for a potential uplink SR from the UEs. A "poll" may refer to a request from the base station to trigger an SR of one or more logical channels from the UE. The base station may transmit a polling request to UEs in a connected mode, for example, to request information about their uplink buffer status. In some aspects, a poll may request an SR that indicates whether or not the UE has data for one or more logical channels, and the UE may respond by transmitting a positive SR or a negative SR based on whether the UE has data for transmission from the one or more logical channels. The UE may transmit the SR in a specific PUCCH or PUSCH resource, in some examples. The polling mechanism may provide the base station with the ability to improve control over the timing of the polling response. This enables the base station to tune its reception beam to the UE based on the base station's timing in order to improve SR reception and reduce latency. In some aspects, the SR transmission may be referred to as an SR polling response.

A UE that receives a polling request for SR for a logical channel, and which has a nonempty uplink data buffer from the logical channel, may report the UE's buffer status as uplink control information (UCI). In some aspects, the UE may transmit the UCI in a pre-configured PUCCH resource. The polling request may provide for the UE 402 to transmit an aperiodic SR. In contrast to a periodic SR mechanism, where the UE initiates the SR transmission in a periodic PUCCH transmission occasion, e.g., as in FIG. 4, the polling may enable the base station 404 to dynamically trigger SR transmission from the UE 402. The more dynamic control allows the base station to coordinate SR transmissions from various UEs in a way that provides more efficient spatial sweeping by the base station for SR detection. The more dynamic control at the base station 404 may also provide more flexible resource scheduling and better latency control.

Periodic polling of SR from the UE 402 in order to provide uplink resources to the UE in a timely manner, e.g., with polling at a configured time interval, may place a constant overhead burden on the network, similar to the periodic listening for SR. Some aspects presented herein provide a mechanism for opportunistic SR polling, e.g., non-periodic SR polling, that more efficiently schedule uplink resources at the base station side.

Figure 5B:
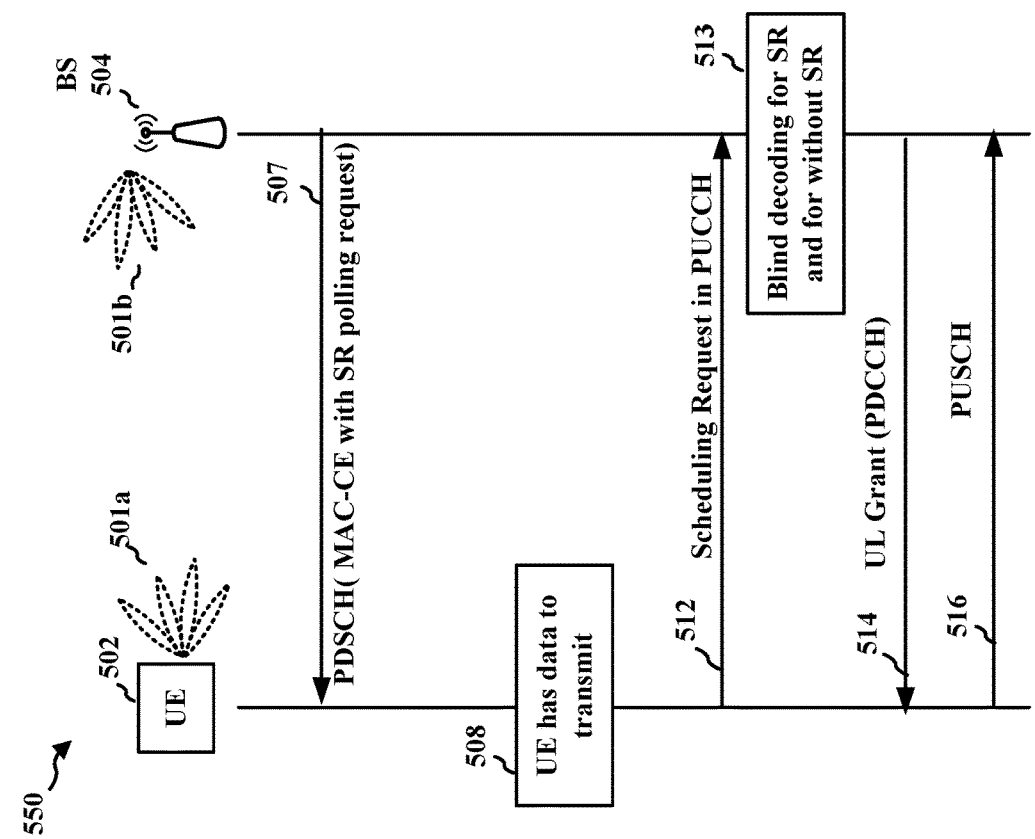
FIGS. 5A and 5B illustrate communication flows showing example aspects of SR transmission based on polling from a base station.
Figure 5A:
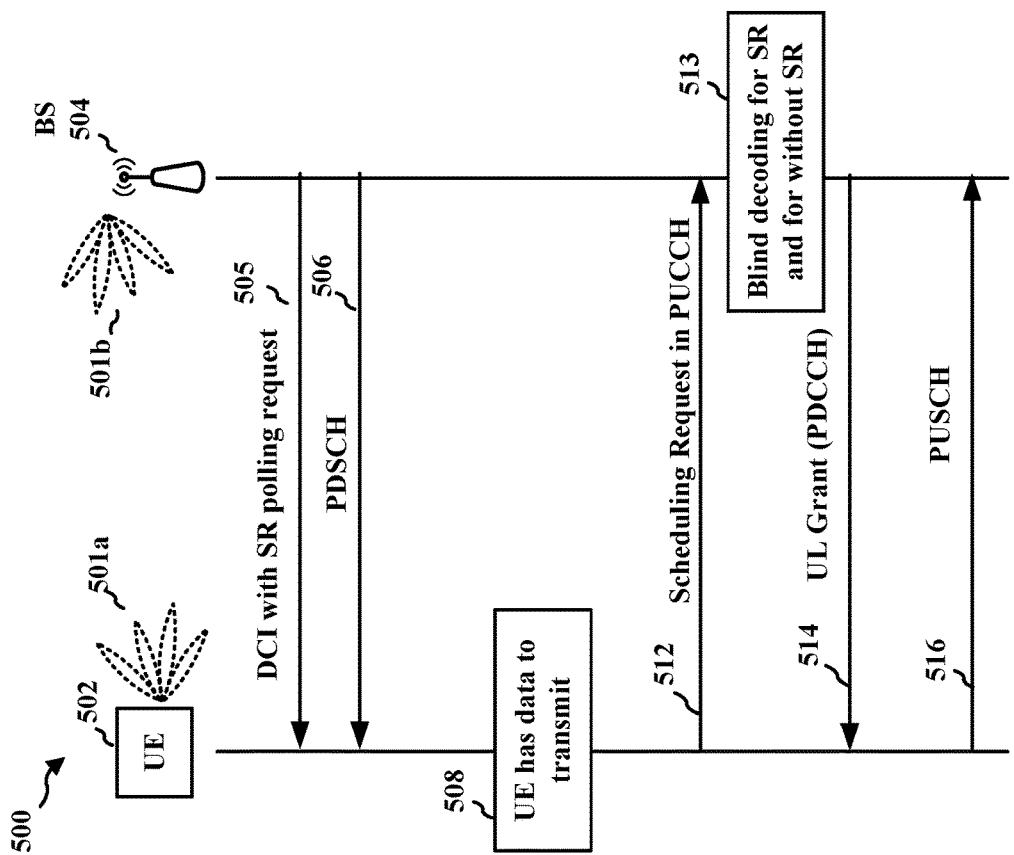

In some aspects, a base station may transmit an explicit polling indication to the UE. FIGS. 5A and 5B illustrates example communication flows 500 and 550 between a UE 502 and a base station 504 including an explicit polling request from the base station 504 to the UE 502. The UE 502 and the base station 504 may communicate based on beamforming using beams 501*a* and 501*b*, similar to the description in connection with FIG. 4. As an example, the UE 502 may receive a downlink transmission from the base station 504 including one or more bits indicating an SR request from the base station 504. The indication to transmit the SR may further indicate one or more logical channels associated with the SR, where the UE transmits the SR of the one or more logical channels in the one or more PUCCH resources.

In some aspects, the polling indication, or SR request, may be included in a downlink grant from the base station 504 and may indicate an SR polling request for SR to be carried in a PUCCH triggered for HARQ feedback by the downlink grant, e.g., a grant of resources, or scheduling information, for a PDSCH 506, such as in DCI 505. For example, a downlink DCI 505 may include one or more bits for a polling request. The one or more bits may be referred to as an "sr-PollingRequest" or by another name. A "0" bit may indicate that the base station is not sending an SR polling request. A "1" bit may indicate an SR polling request from the base station 504. Thus, in response to receiving one or more bits of a downlink grant that indicate an SR polling request from the base station 504, the UE 502 may transmit an SR 512. In some aspects, the UE 502 may transmit a positive SR if the UE 502 has data for transmission or may transmit a negative SR if the UE 502 does not have data for transmission.

In some aspects, the base station 504 may transmit an explicit polling request for an SR in a MAC-CE carried in a PDSCH 507, as shown in FIG. 5B. Upon receiving the SR polling request in the MAC-CE, (e.g., in PDSCH 507), the UE 502 may transmit the SR 512 together with the HARQ codebook feedback for the received PDSCH 507. The SR polling request may be carried in a field or may be indicated by a parameter of a MAC-CE that is transmitted for additional purpose besides SR polling. The SR polling request may be carried in a MAC-CE that is solely for the purpose of SR polling. The MAC-CE may have an assigned header with a value not used for other purposes, or that is specific to SR polling requests. In some aspects, the MAC-CE may not include content, and may have a MAC-CE size of 0. The presence of the header of the MAC-CE may indicate to the UE 502 that the base station 504 is polling SR from the UE 502. In some aspects, the base station 404 may have configured periodic resources for downlink transmissions to the UE 502, such as for a semi-persistent scheduling (SPS)

PDSCH resources. The base station 504 may transmit SPS PDSCH to the UE 502 based on periodic resources that are previously configured/scheduled and without a dynamic downlink grant for each PDSCH transmission. In some aspects, the MAC-CE may be transmitted in an SPS PDSCH. In other aspects, the MAC-CE may be transmitted in a non-periodic PDSCH, e.g., that is scheduled based on a dynamic downlink grant. In some aspects, a MAC layer involvement may lead to a longer timeline.

The UE 502 may include the SR 512 as one or more bits multiplexed with a HARQ codebook, e.g., for a type 1, type 2, or type 3 HARQ codebook, the UE 502 may include a one or more bit SR if the UE has received the downlink DCI 505 or the MAC-CE with a positive polling request. A "0" bit for the SR request may indicate that the UE 502 does not have data to transmit, and a "1" bit may indicate that the UE 502 does have uplink data to transmit, e.g., as shown at 508. In other aspects, the opposite bit representation may be used. The SR bit may be included at various places within the codebook. As an example, the SR bit may be appended at an end of a HARQ codebook. In another example, the SR bit may be added at a beginning of a HARQ codebook. In another example, the SR bit may be added within the codebook, e.g., based on an offset.

In some aspects, when the UE 502 constructs the HARQ codebook, the UE 502 may include the SR based on a last DCI that the UE received prior to the PUCCH in which the HARQ feedback is to be transmitted. Thus, the UE 502 may rely on, or consider, a last DCI received that is associated with a PUCCH resource in which the UE 502 transmits HARQ. If the last DCI includes the polling request, the UE 502 may transmit the SR 512 in the PUCCH resource with the HARQ feedback. If the last DCI does not include the polling request, the UE 502 may skip transmission, or may refrain from transmitting, the SR, e.g., and may transmit the HARQ feedback without an SR.

Figure 6A:
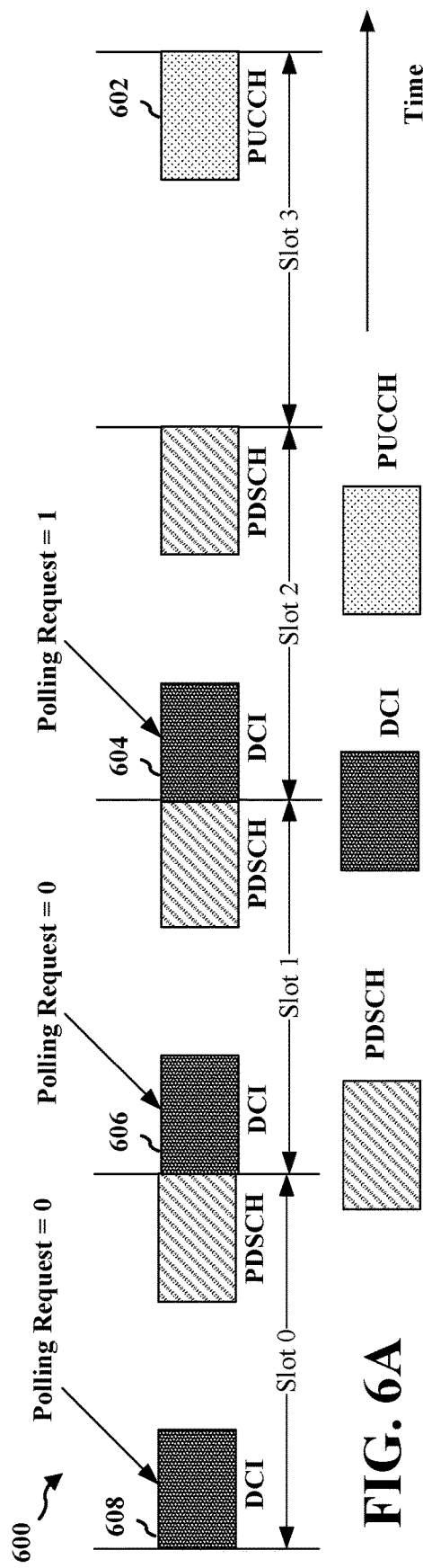
FIGS. 6A and 6B illustrate time diagrams showing example aspects of SR transmission based on polling from a base station.
Figure 6B:
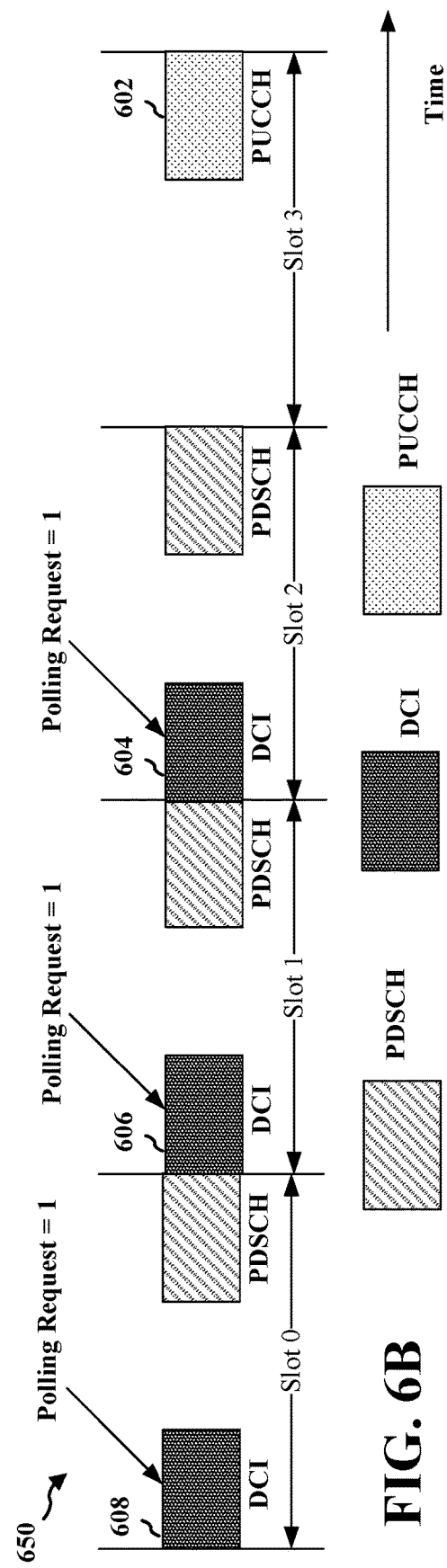

FIGS. 6A and 6B illustrate example time diagrams 600 and 650 showing DCIs for PDSCHs in multiple slots with corresponding HARQ feedback in the PUCCH 602 in slot 3. The DCIs may all be triggering HARQ feedback in the PUCCH resource 602. For example, in FIGS. 6A and 6B, K1=3, 2, 1 for the PDSCH in slots 0, 1, 2, respectively. K1 refers to the time offset between a slot in which the PDSCH is received and a slot in which the UE sends the HARQ PUCCH for the PDSCH. If the UE transmits the SR based on whether a polling request is received in a last DCI triggering HARQ feedback in the PUCCH resource 602, the UE will send the SR in the PUCCH resource 602 based on the DCI 604 indicate a polling request, e.g., indicating a positive polling request with polling request=1, in both FIGS. 6A and 6B.

In some aspects, each DCI associated with HARQ feedback in the PUCCH resource may carry the same polling request bit, e.g., as shown in the example 650 in FIG. 6B. In this example, the UE may transmit the SR in the PUCCH resource with the HARQ feedback. The inclusion of the same SR polling information in each DCI may help to avoid ambiguity about the polling request. As well, if the UE misses a later DCI, the UE may still send the SR based on a prior received DCI that includes the same polling request. In the example shown in FIG. 6B, the UE may send the SR in the PUCCH resource 602 if each of the DCI 604, 606, and 608 indicate a polling request (e.g., polling request=1). In FIG. 6A, as the DCI 606 and 608 do not indicate a polling request, the UE may not send the SR in the PUCCH resource 602.

In some aspects, the UE may treat different polling bits in different DCI for the same PUCCH occasion, e.g., in which one DCI indicates a polling request and another DCI does not, as error. In the example in FIG. 6A, the UE may treat the polling request bits in DCI 604, 606, 608 as an error because they are not consistent. In some aspects, the UE may transmit the SR if any DCI that triggers HARQ feedback in a PUCCH resource indicates a polling request, e.g., even if a later DCI does not include the polling request.

At times, the UE may miss a DCI with a polling request, and may not send a SR together with the HARQ codebook when the base station has requested SR information from the UE. In some aspects, the base station 504 may perform two blind decodings of the received HARQ codebook, e.g., one based on inclusion of SR and one based on exclusion of SR, as shown at 513.

In response to receiving the SR 512, the base station 504 may transmit an uplink grant 514 to the UE 502, e.g., in a PDCCH with uplink resources for the UE to transmit the PUSCH 516.

Figure 7:
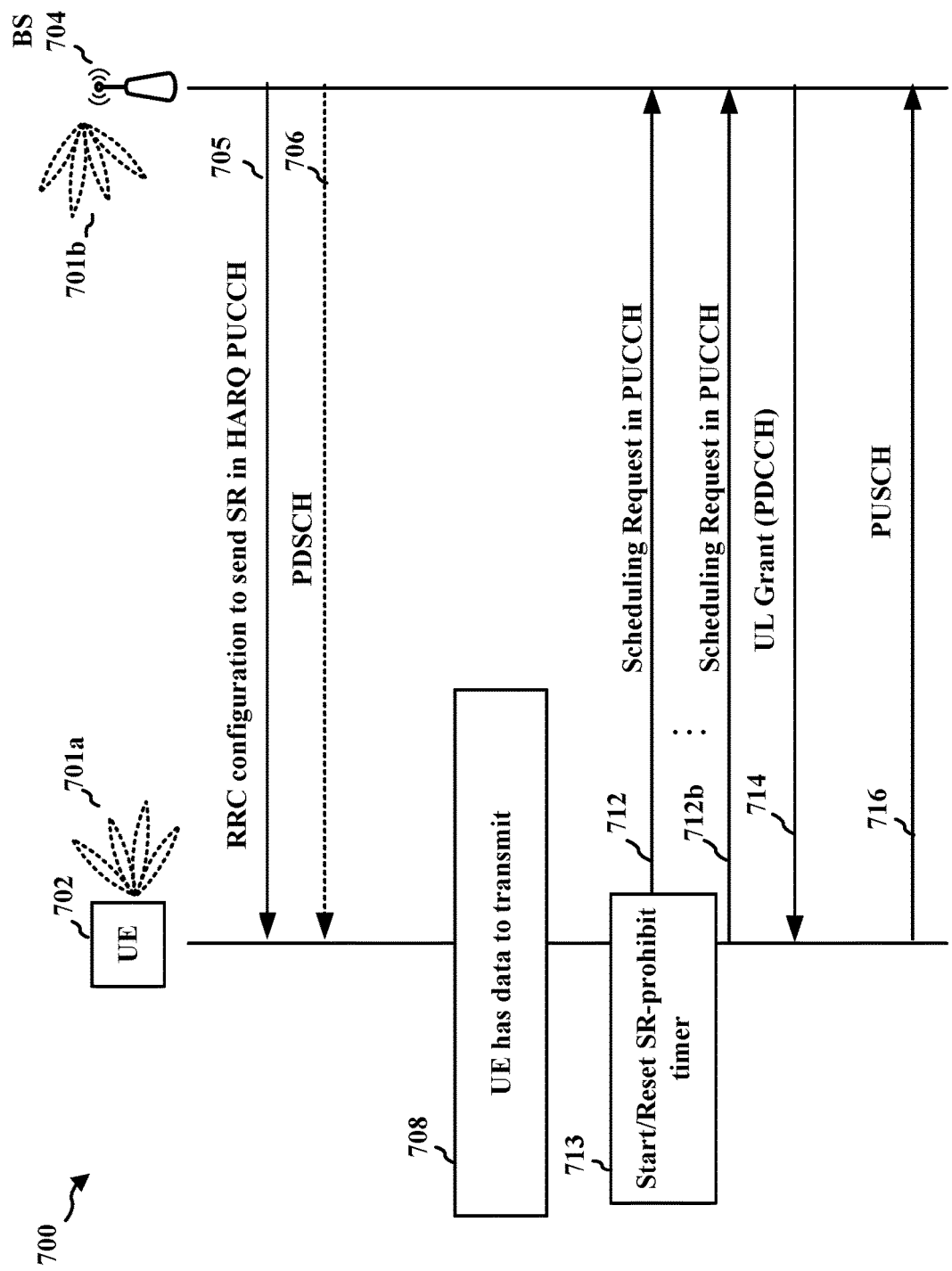
FIG. 7 illustrates a communication flow showing example aspects of SR transmission based on polling from a base station.

In some aspects, the UE may receive an implicit indication from the base station to provide SR information. FIG. 7 illustrates an example communication flow 700 between a UE 702 and a base station 704 showing an example of an implicit indication for an SR polling request. The UE 702 and base station 704 may communicate based on beamforming using beams 701a and 701b, similar to the description in connection with FIG. 4.

As an example, the UE 702 may receive an RRC configuration 705 indicating for the UE to transmit SR in HARQ PUCCH, e.g., PUCCH scheduled for HARQ or in which HARQ is triggered for transmission. The RRC configuration may include a parameter that indicates whether or not the UE 702 is to transmit SR in HARQ PUCCH. In some aspects, the UE 702 may transmit the SR in connection with uplink HARQ feedback, e.g., ACK/NACK feedback for PDSCH. In some aspects, the configuration 705 may configure an association of the one or more PUCCHs resource with the SR of one or more logical channels.

In some aspects, the UE 702 may include a one or more bit SR in each HARQ PUCCH transmission based on the RRC configuration 705. Thus, after receiving the RRC configuration 705, the UE 702 may transmit PUCCH including the SR 712 and HARQ feedback for one or more PDSCH 706 transmissions. In some aspects, the UE 702 may transmit a positive SR, at 712, if the UE has data for transmission, e.g., as illustrated at 708, or may transmit a negative SR, at 712, if the UE does not have data for transmission.

The UE 702 may transmit the SR in the PUCCH, at 712, based on the RRC configuration and without a polling request in DCI, for example.

In some aspects, the UE 702 may not transmit PUCCH that carries SR without HARQ ACK/NACK feedback.

After sending a positive SR, an additional HARQ PUCCH may occur within a timer, e.g., an sr-prohibit timer. For example, the timer may be based on a period of 20 slots, whereas HARQ PUCCH may occur every 2 slots. In some aspects, following transmission of a positive SR, the UE 702 may transmit a negative SR in the following HARQ PUCCH occasions until the minimum time gap indicated by a timer has expired. The timer may correspond to an sr-prohibit timer in some examples. The UE 702 may reset/start the timer at 713, if the UE transmits a positive SR. In other aspects, the UE 702 may transmit a positive SR in each HARQ PUCCH until the UE receives an UL grant, e.g., at 714. As illustrated at 712b, the UE 702 may continue to transmit positive SRs until the UE 702 receives the uplink grant 714. The SR may be considered an SR retransmission in case the PUCCH is not received by the base station 704.

In response to receiving the SR 712, the base station 704 may transmit an uplink grant 714 to the UE 702, e.g., in a PDCCH with uplink resources for the UE to transmit the PUSCH 716.

FIG. 8A illustrates an example time diagram 800 showing the RRC 801 configuring the UE to transmit SR in HARQ PUCCH. Then, at a later slot, the DCI 802 and 806 may trigger HARQ feedback, e.g., ACK/NACK feedback for PDSCH 804 and 808, to be transmitted in PUCCH 810. The UE may include an SR in the PUCCH 810 along with the HARQ feedback. Similarly, the DCI 812 and 816 may schedule PDSCH 814 and 818 and trigger the UE to transmit HARQ feedback for the PDSCH 814 and 818 in the PUCCH 820. The UE may transmit SR information in the PUCCH 810 and the PUCCH 820 based on the RRC configuration. The UE may transmit the SR in the PUCCH 810 and 820 without an additional SR polling indication in the DCI 802, 806, 812, or 816.

In some aspects, SPS PDSCH may trigger HARQ PUCCH without DCI. FIG. 8B illustrates a time diagram 850 in which the UE receives the RRC 851 configuring the UE to transmit SR in HARQ PUCCH. Then, at a later slot, the SPS PDSCH 854 and 858 may trigger HARQ feedback to be transmitted in PUCCH 860, e.g., without a dynamic DCI. The UE may include an SR in the PUCCH 860 along with the HARQ feedback for the PDSCH 854 and 858. Similarly, the PDSCH 864 and 868 may trigger the UE to transmit HARQ feedback for the PDSCH 864 and 868 in the PUCCH 870. The UE may transmit SR information in the PUCCH 860 and the PUCCH 870 based on the RRC configuration 851 and without additional DCI or MAC-CE in PDSCHs 854, 858, 864, or 868 to trigger the SR.

The configuration of a UE to transmit SR in each HARQ PUCCH opportunity may imply a constant overhead for the PUCCH, e.g., as an SR bit may be included in each HARQ PUCCH.

In some aspects, the UE may receive an RRC configuration of SR resources, e.g., periodic PUCCH occasions configured to carry an SR from the UE. The UE may be further configured to transmit SR in PUCCH based on the SR being multiplexed with ACK/NACK feedback, e.g., HARQ feedback. For example, the UE may transmit the SR in the PUCCH if there is ACK/NACK feedback to multiplex with the SR, and may skip transmission of the SR if there is no ACK/NACK feedback for the PUCCH occasion. For example, the base station may poll a SR from the UE by scheduling PDSCH with ACK/NACK triggering in the configured SR occasion. If the ACK/NACK is not included in a PUCCH occasion, the UE may refrain from transmitting an SR in the PUCCH occasion. In some aspects, the RRC configuration of SR resources may be based on a configuration, such as described in connection with FIG. 4.

In some aspects, the UE may receive a different RRC configuration for SR resources to be used in connection with HARQ feedback. The UE may receive one or more parameters that are associated with SR polling requests. As an example, the UE may receive a PUCCH polling request period parameter (e.g., which may be referred to as a PUCCHPollingRequestPeriod) and/or a PUCCH polling request offset (e.g., which may be referred to as a PUCCH-PollingRequestOffset) for the UE. As an example, the UE 702 may transmit the SR 712 in the HARQ PUCCH based on the UE sending HARQ feedback in the PUCCH and further based on the polling request parameters, e.g., if a slot index of the HARQ PUCCH meets the criteria:

$$\text{SlotIndex} \bmod \text{PUCCHPollingRequestPeriod} == \text{PUCCHPollingRequestOffset}$$

Figure 9A:
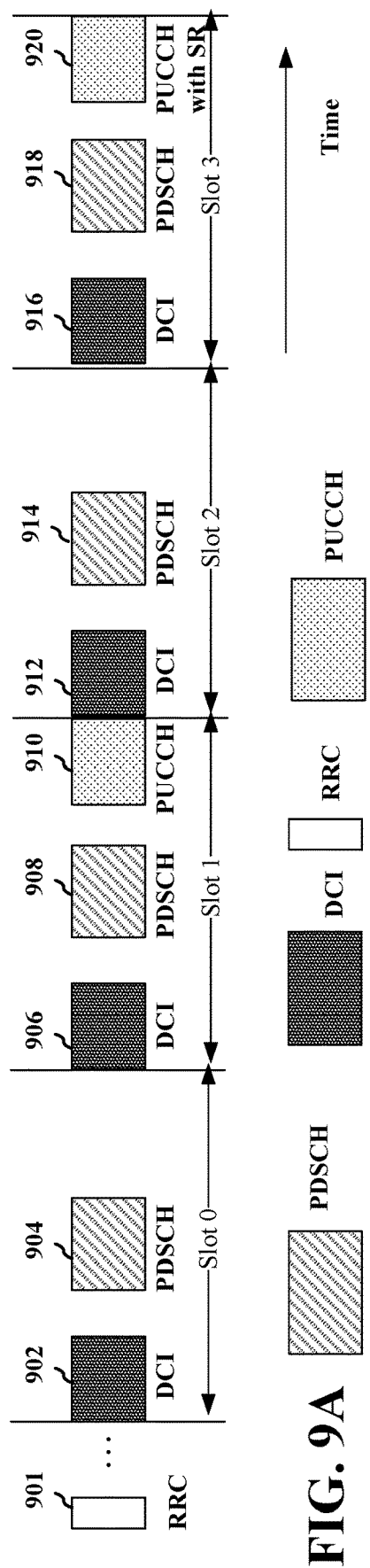
FIGS. 9A and 9B illustrate time diagrams showing example aspects of SR transmission based on polling from a base station.

FIG. 9A illustrates a time diagram 900 showing an RRC configuration 901, which may indicate for the UE to transmit SR in HARQ PUCCH, as described in connection with FIG. 7, and may further include a PUCCH polling request period parameter (e.g., of 4) and/or a PUCCH polling request offset parameter (e.g., of 3). In FIG. 9A, the DCI 902 and 906 carries a downlink grant for the respective PDSCH 904 and 908 and triggers HARQ feedback in PUCCH 910. Similarly, the DCI 912 and 916 may schedule PDSCH 914 and 918 and trigger the UE to transmit HARQ feedback for the PDSCH 914 and 918 in the PUCCH 920 in slot 3. In FIG. 9A, the UE may transmit the SR in the PUCCH 920, because the UE has ACK/NACK feedback to transmit for the PDSCH 914 and 918 and because the criteria SlotIndex mod PUCCHPollingRequestPeriod==PUCCHPollingRequestOffset is met for slot 3. In slot 1, the UE may not transmit the SR in the PUCCH, even though the UE has ACK/NACK to transmit in the PUCCH 910 because the criteria based on the PUCCH polling request period and the PUCCH polling request offset is not met for PUCCH 910 in slot 1. In slot 1, the UE transmits HARQ feedback, e.g., ACK/NACK, in the PUCCH 910. In slot 3, the UE transmits SR and HARQ feedback in the PUCCH 920.

Figure 9B:
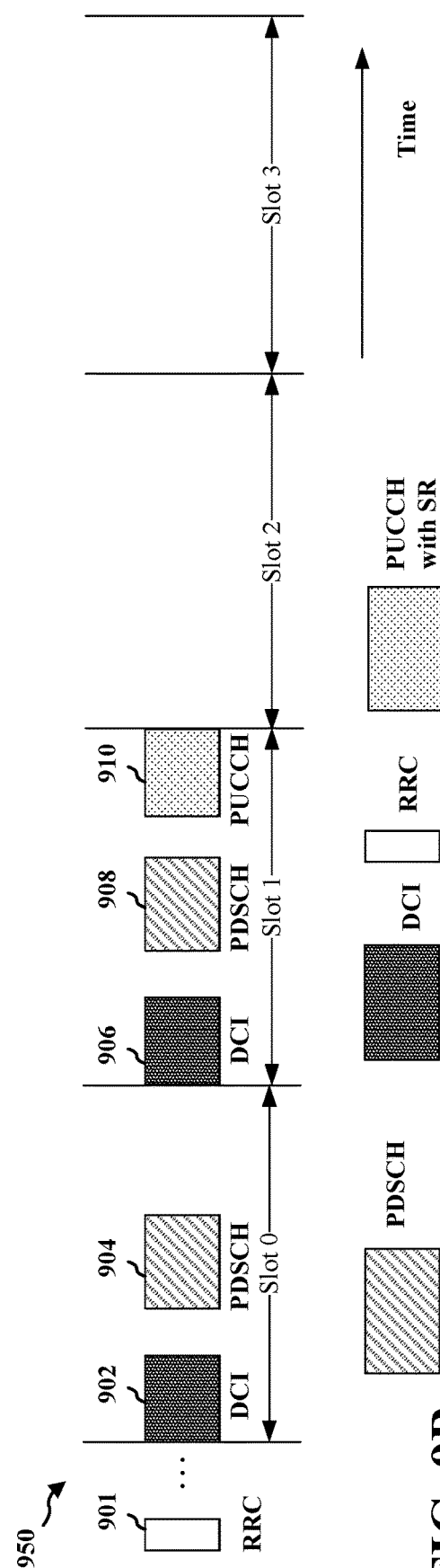

In contrast to the transmission of the SR in the PUCCH 920 in slot 3 of FIG. 9A, in the example 950 in FIG. 9B, the UE does not transmit SR in a PUCCH in slot 3 because the UE does not have ACK/NACK feedback to transmit because no PDSCH was scheduled/transmitted in slot 2 or slot 3. Thus, in FIG. 9B, the UE transmits HARQ feedback, e.g., ACK/NACK, in the PUCCH 910 in slot 1, and does not transmit HARQ feedback or SR in slot 3.

In some aspects, the base station may request SR information from the UE in the absence of downlink data. If there is no downlink data, the base station may transmit an uplink grant to the UE. The UE may report a buffer status report (BSR) to the base station in the granted uplink resources, e.g., which may be for PUSCH. In some aspects, the uplink grant may be provided to trigger SR transmission by the UE without a configuration for periodic SR. In some aspects, the periodic SR may be disabled, e.g., in an RRC configuration.

In some aspects, the base station may transmit a DCI that does not schedule actual data, e.g., a DCI with an empty downlink grant that does not schedule PDSCH. In some aspects, the DCI 505 may include an empty downlink grant, and may be sent by the base station 504 to poll SR from the UE without scheduling PDSCH. In some aspects, the DCI may include an invalid frequency domain resource assignment (FDRA) field, which may indicate to the UE that the base station is polling SR. If there is no ACK/NACK to multiplex with the SR, the UE may transmit SR in the PUCCH without the HARQ feedback, which may be referred to as an SR only PUCCH. In some aspects, the DCI, or the grant indicated in the DCI, may trigger type-3 HARQ-ACK feedback. In some aspects, type-3 HARQ-ACK feedback may be referred to as a one-shot HARQ-ACK feedback or a full HARQ report and may be based on a HARQ-ACK codebook containing HARQ-ACK feedback corresponding to all downlink HARQ processes for all component carriers (CCs) configured for the UE in a PUCCH group. The SR may be multiplexed with the type 3 HARQ codebook in a PUCCH.

In some aspects, the UE may transmit the base station polled SR, e.g., as described in connection with FIGS. 5A, 5B, and/or FIG. 7, in addition to SR based on a periodic configuration, such as described in connection with FIG. 4. The SR polling may be complementary to the periodic SR mechanism. In some aspects, the periodic SR parameters may be configured to reduce the density of SR transmission occasions, e.g., with a longer periodicity, to reduce overhead, along with the use of SR polling to provide for more dynamic SR transmission.

In some aspects, the periodic SR transmission described in connection with FIG. 4 may be disabled and the SR polling may be enabled. In some aspects, the configuration of the UE to provide SR in response to SR polling requests, as in FIG. 5, or in HARQ PUCCH, as in FIG. 7, may indicate to the UE that the periodic SR transmission is disabled.

Figure 10:
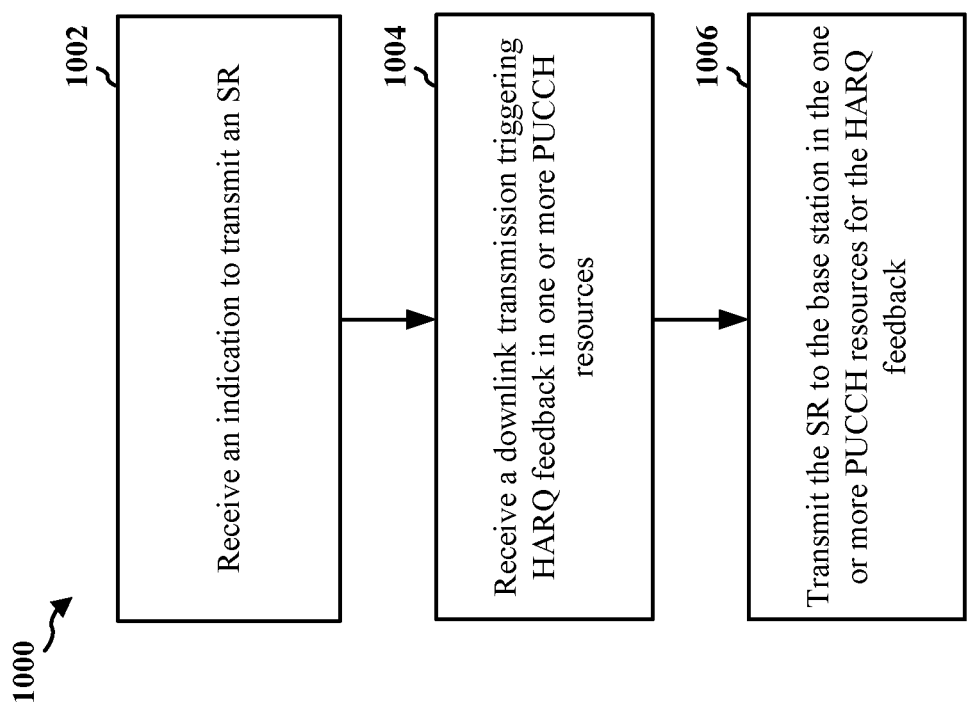
FIG. 10 is a flowchart of a method of wireless communication.

FIG. 10 is a flowchart 1000 of a method of wireless communication. The method may be performed by a UE (e.g., the UE 104, 350, 402, 502, 702; the apparatus 1102). The method provides for SR transmission in response to SR polling that enables more dynamic network control over the manner in which the base station monitors for SR from a UE. The added control may enable the base station to employ more efficient spatial sweeping, in some examples.

At 1002, the UE receives, from a base station, an indication to transmit a SR. In some aspects, the SR may indicate a positive SR indicating that the UE has data for transmission or a negative SR indicating that the UE does not have data for transmission. The reception may be performed, e.g., by the SR poll component 1140 of the apparatus 1102 in FIG. 11. The indication to transmit the SR may further indicate one or more logical channels associated with the SR, where the UE transmits the SR of the one or more logical channels in the one or more PUCCH resources. The indication may be included in one or more bits in a downlink grant that triggers the HARQ feedback in the one or more PUCCH resources. FIG. 5A illustrates an example in which a DCI 505 that indicates an SR polling request. FIGS. 6A and 6B illustrate example aspects of a downlink grant that indicates a request for an SR. The one or more bits may indicate an SR polling request. In some aspects, the indication may be included in a MAC-CE in a PDSCH requesting HARQ feedback in the one or more PUCCH resources. FIG. 5B illustrates an example of a MAC-CE 507 that indicates an SR polling request. In some aspects, the indication may be received in a latest DCI triggering HARQ feedback in the one or more PUCCH resources, e.g., as described in connection with the example in FIGS. 6A and 6B. In some aspects, the indication may be received in one or more DCI triggering HARQ feedback in the one or more PUCCH resources, e.g., as described in connection with the example in FIGS. 6A and 6B. The indication may be received in each DCI triggering the HARQ feedback in the one or more PUCCH resources.

At 1004, the UE receives a downlink transmission triggering HARQ feedback in one or more PUCCH resources. In some aspects, the downlink transmission may be a DCI and PDSCH that triggers a HARQ codebook, such as described in connection with FIGS. 6A, 6B, 8A, 9A, and/or 9B. In other aspects, the downlink transmission may be a PDSCH that triggers a HARQ codebook without a DCI, e.g., as described in connection with FIG. 8B. The downlink transmission may be a DCI, for example. The downlink transmission may be a PDSCH, for example. The downlink transmission may be a combination of a DCI and a PDSCH. The reception may be performed, e.g., by the HARQ PUCCH component 1142 of the apparatus 1102 in FIG. 11.

At 1006, the UE transmits the SR to the base station in the one or more PUCCH resources for the HARQ feedback. The transmission may be performed, e.g., by the SR component 1144 of the apparatus 1102 in FIG. 11. The transmission may be based on any of the aspects described in connection with FIGS. 5-9B, for example. The SR may be transmitted together with a HARQ codebook. The SR may be appended before or after the codebook or may be included within the codebook, e.g., based on an offset. In some aspects, the UE may retransmit a positive SR in each PUCCH resource for HARQ feedback until an uplink grant is received, e.g., as described in connection with 712b in FIG. 7. In some aspects, the UE may transmit a negative SR in one or more PUCCH resources for a threshold amount of time following a positive SR, e.g., as described in connection with 413 and/or 713 in FIG. 4 or FIG. 7.

In some aspects, the UE may transmit scheduling request information in each PUCCH resource for HARQ feedback based on the RRC configuration, e.g., as described in connection with any of FIG. 7, 8A, or 8B. In some aspects, the UE may transmit the SR to the base station in the one or more PUCCH resources for the HARQ feedback based on the UE having ACK/NACK feedback to transmit in the one or more PUCCH resources, e.g., as described in connection with FIGS. 9A and 9B. In some aspects, the UE may not transmit the SR to the base station in a resource in which the UE does not have the ACK/NACK feedback for transmission, e.g., as described in connection with slot 3 of FIG. 9B. In some aspects, the UE may receive a downlink grant that does not schedule a PDSCH, and the UE may transmit the SR in the PUCCH resource for the HARQ feedback triggered by the downlink grant. In some aspects, the downlink grant may trigger a type-3 HARQ-ACK feedback.

In some aspects, the UE may further receive, from the base station, a configuration of an association of the one or more PUCCHs resource with the SR of one or more logical channels, and at 1006, the UE may transmit the SR of the one or more logical channels in the one or more PUCCH resources. The indication, at 1002, may include an RRC configuration to include the SR in the one or more PUCCH resources. The configuration of the association of the PUCCH resource to the logical channel may enable the UE to determine which logical channel's SR to be transmitted in the PUCCH resource.

In some aspects, the UE may receive an RRC message configuring one or more of a request period parameter or a request offset parameter for transmission of the SR request in the one or more PUCCH resources for the HARQ feedback, e.g., as described in connection with FIG. 9A or 9B.

In some aspects, the UE may receive a configuration for SR transmission in non-HARQ PUCCH resources, and the UE may transmit an additional SR in a non-HARQ PUCCH resource based on the configuration. For example, the UE may receive a configuration as described in connection with FIG. 4 and may transmit SR based on the configuration, e.g., in addition to transmitting SR in response to an SR poll request, as described in connection with any of FIGS. 5A, 5B, or FIG. 7. The configuration for the SR transmission in the non-HARQ PUCCH resources may have a reduced density based on the SR transmission in HARQ PUCCH resources being enabled for the UE.

In some aspects, the UE may disable SR transmission in non-HARQ PUCCH resources based on a configuration enabling the SR transmission in HARQ PUCCH resources. For example, the UE may disable SR transmission based on a periodic mechanism, as in FIG. 4, in response to receiving a configuration for SR polling, as described in connection with any of FIGS. 5A, 5B, FIG. 7. In some aspects, the UE may receive an uplink grant for the SR transmission and may transmit a BSR based on the uplink grant.

Figure 11:
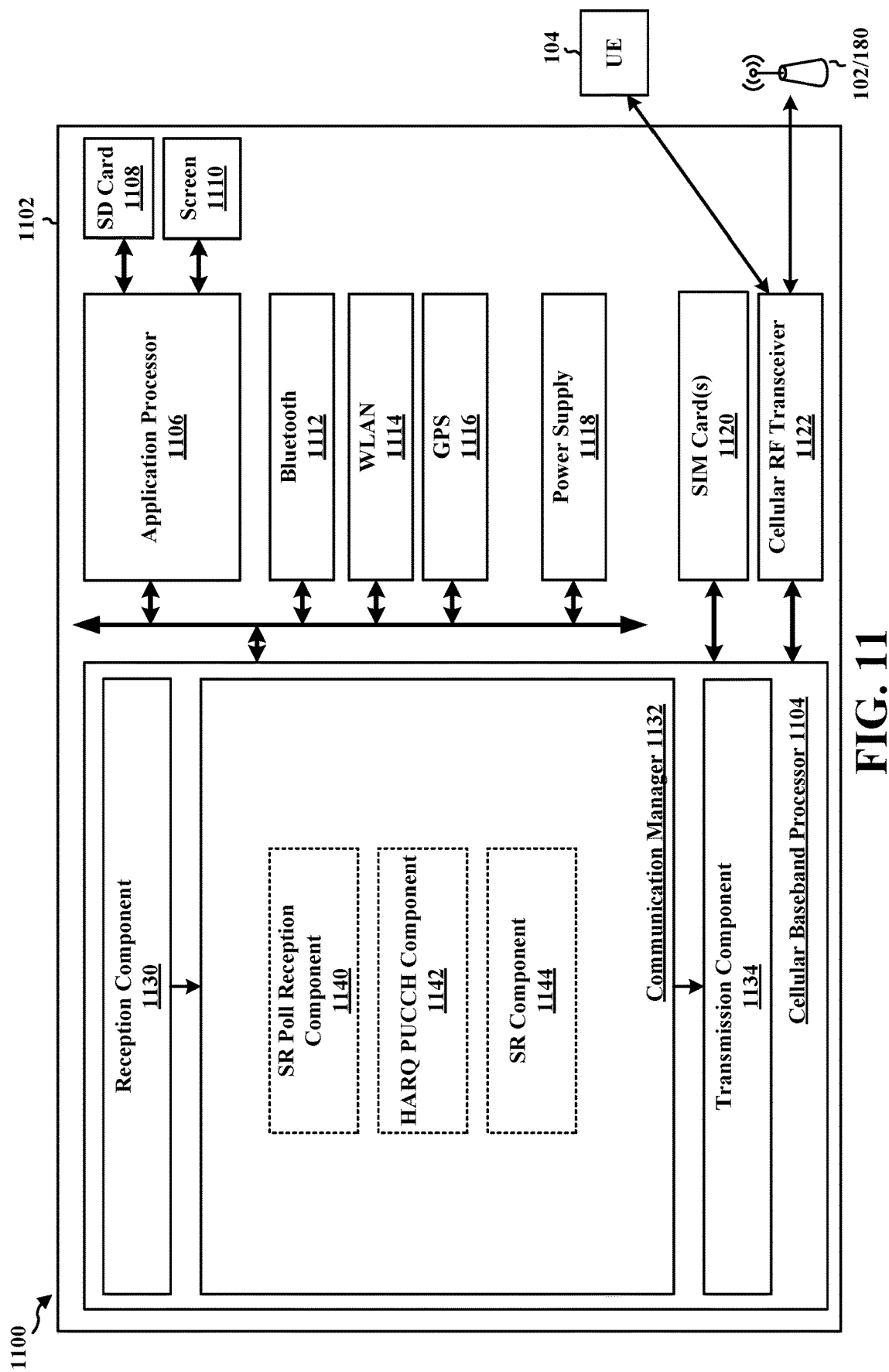
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and/or a power supply 1118. The cellular baseband processor 1104 communicates through the cellular RF transceiver 1122 with the UE 104 and/or base station 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described herein. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes an SR poll component 1140 that is configured to receive an indication to transmit an SR, e.g., as described in connection with 1002 in FIG. 10. The communication manager 1132 further includes a HARQ PUCCH component 1142 that is configured to receive a downlink transmission triggering HARQ feedback in one or more PUCCH resources, e.g., as described in connection with 1004 in FIG. 10. The communication manager 1132 further includes an SR component 1144 that is configured to transmit the SR to the base station in the one or more PUCCH resources for the HARQ feedback, e.g., as described in connection with 1006 in FIGS. 6A and 6B.

The apparatus may include additional components that perform each of the blocks of the algorithm, or the additional aspects, in the flowchart of FIG. 10, and/or the aspects performed by the UE in any of FIG. 4, 5, or 7. As such, each, or the additional aspects, in the flowchart of FIG. 10, and/or the aspects performed by the UE in any of FIG. 4, 5, or 7, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving an indication to transmit an SR, means for receiving a downlink transmission triggering HARQ feedback in one or more PUCCH resources, and means for transmitting the SR to the base station in the one or more PUCCH resources for the HARQ feedback. The apparatus 1102 may further include means for receiving, from the base station, a configuration of an association of the one or more PUCCHs resource with the SR of one or more logical channels, wherein the UE transmits the SR of the one or more logical channels in the one or more PUCCH resources. The apparatus 1102 may further include means for retransmitting a positive SR in each PUCCH resource for HARQ feedback until an uplink grant is received. The apparatus 1102 may further include means for transmitting a negative SR in one or more PUCCH resources for a threshold amount of time following a positive SR. The apparatus 1102 may further include means for transmitting scheduling request information in each PUCCH resource for HARQ feedback based on the RRC configuration. The apparatus 1102 may further include means for receiving a radio resource control (RRC) message configuring one or more of a request period parameter or a request offset parameter for transmission of the SR request in the one or more PUCCH resources for the HARQ feedback. The apparatus 1102 may further include means for receiving a downlink grant that does not schedule a physical downlink shared channel (PDSCH), wherein the UE transmits the SR in the PUCCH resource for the HARQ feedback triggered by the downlink grant. The apparatus 1102 may further include means for receiving a configuration for SR transmission in non-HARQ PUCCH resources and means for transmitting an additional SR in a non-HARQ PUCCH resource based on the configuration. The apparatus 1102 may further include means for disabling SR transmission in non-HARQ PUCCH resources based on a configuration enabling the SR transmission in HARQ PUCCH resources. The apparatus 1102 may further include means for receiving an uplink grant for the SR transmission and means for transmitting a BSR based on the uplink grant. The means may be one or more of the components of the apparatus 1102 configured to perform the functions recited by the means. As described herein, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
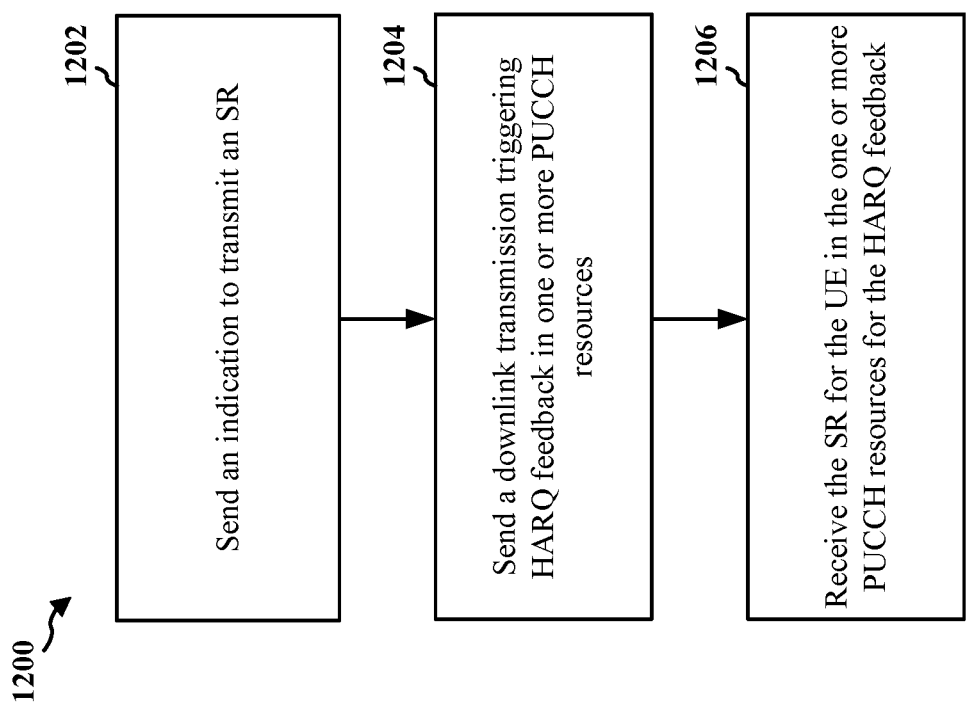
FIG. 12 is a flowchart of a method of wireless communication.

FIG. 12 is a flowchart 1200 of a method of wireless communication. The method may be performed by a network node (e.g., the base station 102/180, 310, 404, 504, 704, or a component of the base station; the apparatus 1302). The method provides for SR transmission in response to SR polling that enables more dynamic network control over the manner in which the base station monitors for SR from a UE. The added control may enable the base station to employ more efficient spatial sweeping, in some examples.

At 1202, the network node transmits, e.g., to a UE, an indication for the UE to transmit a SR. In some aspects, the SR may be a positive SR indicating that the UE has data for transmission or a negative SR indicating that the UE does not have data for transmission. The transmission may be performed, e.g., by the SR poll component 1340 of the apparatus 1302 in FIG. 13. The indication to transmit the SR may further indicate one or more logical channels associated with the SR, where the network node receives the SR of the one or more logical channels in the one or more PUCCH resources. The indication may be included in one or more bits in a downlink grant that triggers the HARQ feedback in the one or more PUCCH resources. FIG. 5A illustrates an example of a DCI 505 that indicates an SR polling request. FIGS. 6A and 6B illustrate example aspects of a downlink grant that indicates a request for an SR. The one or more bits may indicate an SR polling request. In some aspects, the indication may be included in a MAC-CE in a PDSCH triggering HARQ feedback in the one or more PUCCH resources. FIG. 5B illustrates an example of a MAC-CE 507 that indicates an SR polling request. In some aspects, the indication may be transmitted in a latest DCI triggering HARQ feedback in the one or more PUCCH resources, e.g., as described in connection with the example in FIG. 6A. In some aspects, the indication may be transmitted in one or more DCI triggering HARQ feedback in the one or more PUCCH resources, e.g., as described in connection with the example in FIGS. 6A and 6B. The indication may be transmitted in each DCI triggering the HARQ feedback in the one or more PUCCH resources.

At 1204, the network node sends a downlink transmission triggering HARQ feedback in one or more PUCCH resources. In some aspects, the downlink transmission may be a DCI and PDSCH that triggers a HARQ codebook, such as described in connection with FIGS. 6A, 6B, 8A, 9A, and/or 9B. In other aspects, the downlink transmission may be a PDSCH that triggers a HARQ codebook without a DCI, e.g., as described in connection with FIG. 8B. The downlink transmission may be a DCI, for example. The downlink transmission may be a PDSCH, for example. The downlink transmission may be a combination of a DCI and a PDSCH. The transmission may be performed, e.g., by the HARQ PUCCH component 1342 of the apparatus 1302 in FIG. 13.

At 1206, the network node receives the SR for the UE in the one or more PUCCH resources for the HARQ feedback. For example, the SR may be received from the UE. The reception may be performed, e.g., by the SR component 1344 of the apparatus 1302 in FIG. 13. The reception may be based on any of the aspects described in connection with FIGS. 5-9B, for example. The SR may be received together with a HARQ codebook. The SR may be appended before or after the codebook or may be included within the codebook, e.g., based on an offset. In some aspects, the network node may receive a retransmission of a positive SR in each PUCCH resource for HARQ feedback until an uplink grant is transmitted, e.g., as described in connection with 712b in FIG. 7. In some aspects, the network node may receive a negative SR in one or more PUCCH resources for a threshold amount of time following a positive SR, e.g., as described in connection with 413 and/or 713 in FIG. 4 or FIG. 7.

In some aspects, the network node may receive scheduling request information in each PUCCH resource for HARQ feedback based on the RRC configuration, e.g., as described in connection with any of FIG. 7, 8A, or 8B. In some aspects, the network node may receive the SR from the UE in the one or more PUCCH resources for the HARQ feedback based on the UE having ACK/NACK feedback to transmit in the one or more PUCCH resources, e.g., as described in connection with FIGS. 9A and 9B. In some aspects, the network node may not receive the SR from the UE in a resource in which the UE does not have the ACK/NACK feedback for transmission, e.g., as described in connection with slot 3 of FIG. 9B. In some aspects, the network node may transmit a downlink grant that does not schedule a PDSCH, and the network node may receive the SR in the PUCCH resource for the HARQ feedback triggered by the downlink grant. In some aspects, the downlink grant may trigger a type-3 HARQ-ACK feedback. In some aspects, the network node may perform a first blind decoding of the HARQ feedback based on inclusion of the SR and may perform a second blind decoding of the HARQ feedback based on exclusion of the SR.

In some aspects, the network node may further transmit a configuration of an association of the one or more PUCCHs resource with the SR of one or more logical channels, and at 1206, the network node may receive the SR of the one or more logical channels in the one or more PUCCH resources. The indication, at 1202, may include an RRC configuration to include the SR in the one or more PUCCH resources. The configuration of the association of the PUCCH resource to the logical channel may indicate to the UE which PUCCH resource to use to transmit an SR for a particular logical channel.

In some aspects, the network node may transmit an RRC message configuring one or more of a request period parameter or a request offset parameter for transmission of the SR request in the one or more PUCCH resources for the HARQ feedback, e.g., as described in connection with FIG. 9A or 9B.

In some aspects, the network node may transmit a configuration for SR transmission in non-HARQ PUCCH resources, and the network node may receive an additional SR in a non-HARQ PUCCH resource based on the configuration. For example, the network node may transmit a configuration as described in connection with FIG. 4 and may receive an SR based on the configuration, e.g., in addition to transmitting SR in response to an SR poll request, as described in connection with any of FIGS. 5A, 5B, or FIG. 7. The configuration for the SR transmission in the non-HARQ PUCCH resources may have a reduced density based on the SR transmission in HARQ PUCCH resources being enabled for the UE.

In some aspects, the network node may disable SR transmission in non-HARQ PUCCH resources based on a configuration enabling the SR transmission in HARQ PUCCH resources. For example, the network node may disable SR transmission based on a periodic mechanism, as in FIG. 4, by transmitting a configuration for SR polling, as described in connection with any of FIGS. 5A, 5B, or FIG. 7. In some aspects, the network node may transmit an uplink grant for the SR transmission and may receive a BSR based on the uplink grant.

Figure 13:
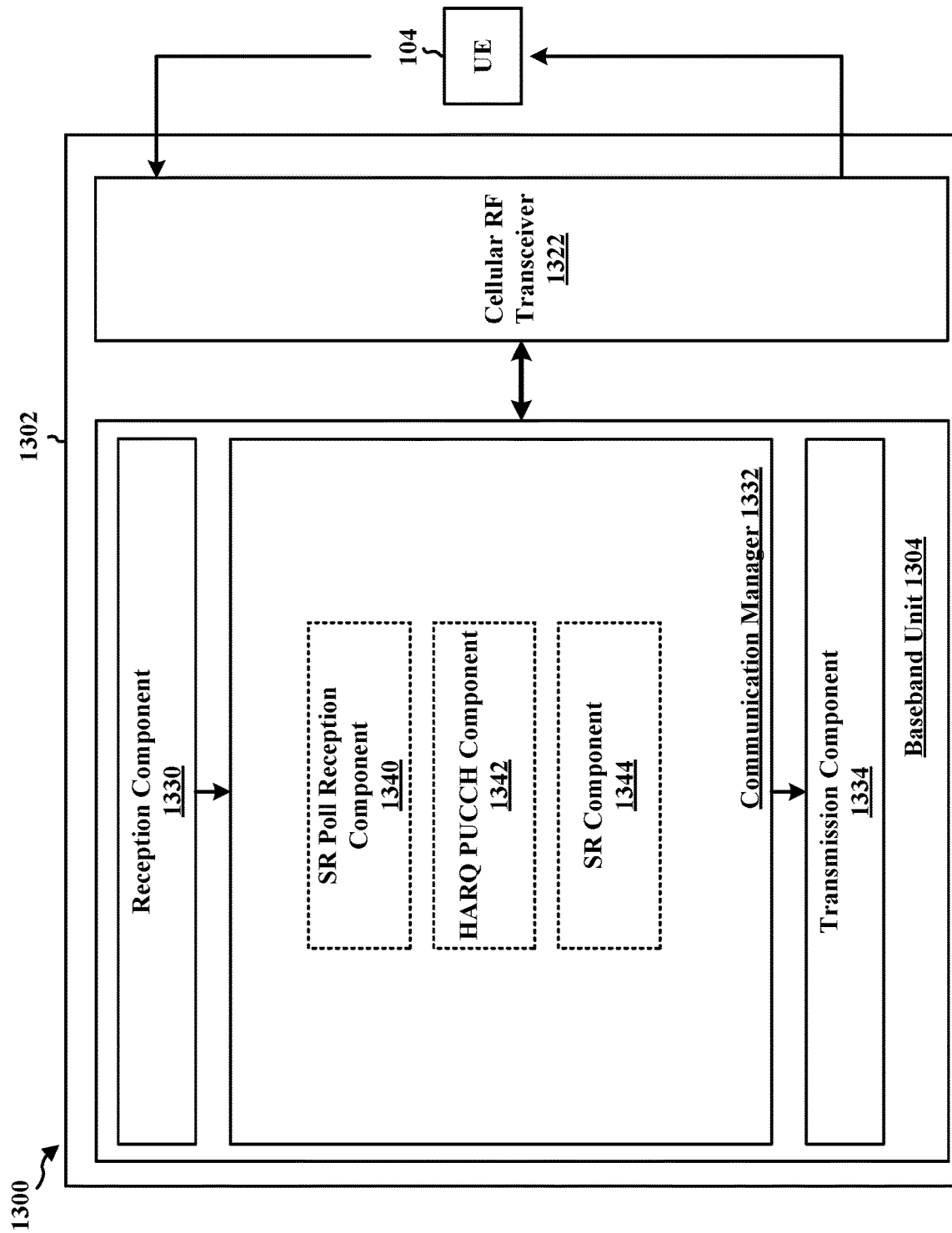
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1302 may include a baseband unit 1304 and/or an RF transceiver 1322. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described herein. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes an SR poll component 1340 that is configured to transmit, to a UE, an indication to transmit an SR, e.g., as described in connection with 1202 in FIG. 12. The communication manager 1332 further includes a HARQ PUCCH component 1342 that is configured to transmit a downlink transmission triggering HARQ feedback in one or more PUCCH resources, e.g., as described in connection with 1204 in FIG. 12. The communication manager 1332 further includes an SR component 1344 that is configured to receive the SR from the UE in the one or more PUCCH resources for the HARQ feedback, e.g., as described in connection with 1206 in FIG. 12.

The apparatus may include additional components that perform each of the blocks of the algorithm, and the additional aspects, in the flowchart of FIG. 12, and/or the aspects performed by the base station in FIG. 4, 5, or 7. As such, each block in the flowchart of FIG. 12, and/or the aspects performed by the base station in FIG. 4, 5, or 7, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting, to a UE, an indication to transmit a SR, means for transmitting a downlink transmission triggering HARQ feedback in one or more PUCCH resources, and means for receiving the SR from the UE in the one or more PUCCH resources. The apparatus 1302 may further include means for performing a first blind decoding of the HARQ feedback based on inclusion of the SR and for performing a second blind decoding of the HARQ feedback based on exclusion of the SR. The apparatus 1302 may further include means for configuring an association of the one or more PUCCHs resource with the SR of one or more logical channels, wherein the base station receives the SR of the one or more logical channels in the one or more PUCCH resources. The apparatus 1302 may further include means for receiving a retransmission of a positive SR in each PUCCH resource for HARQ feedback until an uplink grant is transmitted. The apparatus 1302 may further include means for receiving a negative SR in one or more PUCCH resources for a threshold amount of time following a positive SR. The apparatus 1302 may further include means for receiving scheduling request information in each PUCCH resource for HARQ feedback based on the RRC configuration. The apparatus 1302 may further include means for transmitting an RRC message configuring one or more of a request period parameter or a request offset parameter for transmission of the SR in the one or more PUCCH resources for the HARQ feedback. The apparatus 1302 may further include means for transmitting a downlink grant that does not schedule a PDSCH, wherein the base station receives the SR in the one or more PUCCH resources for the HARQ feedback triggered by the downlink grant. The apparatus 1302 may further include means for transmitting a configuration for SR transmission in non-HARQ PUCCH resources and means for receiving an additional SR in a non-HARQ PUCCH resource based on the configuration. The apparatus 1302 may further include means for disabling SR transmission in non-HARQ PUCCH resources by enabling the SR transmission in HARQ PUCCH resources. The apparatus 1302 may further include means for transmitting an uplink grant for the SR transmission means for receiving a BSR based on the uplink grant. The means may be one or more of the components of the apparatus 1302 configured to perform the functions recited by the means. As described herein, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

Aspects presented herein provide a mechanism for opportunistic SR polling, e.g., non-periodic SR polling, that enables the base station more dynamic control over the manner in which the base station monitors for SR from a UE. The added control may enable the base station to employ more efficient spatial sweeping for SR detect, more flexible resource scheduling, or better latency control.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user equipment (UE), comprising: receiving, from a base station, an indication to transmit a scheduling request (SR); receiving a downlink transmission triggering hybrid automatic repeat request (HARQ) feedback in one or more physical uplink control channel (PUCCH) resources; and transmitting the SR to the base station in the one or more PUCCH resources for the HARQ feedback.

In aspect 2, the method of aspect 1 further includes that the indication to transmit the SR further indicates one or more logical channels associated with the SR, where the UE transmits the SR of the one or more logical channels in the one or more PUCCH resources.

In aspect 3, the method of aspect 1 or aspect 2 further includes that the indication comprises one or more bits in a downlink grant that triggers the HARQ feedback in the one or more PUCCH resources.

In aspect 4, the method of aspect 3 further includes that the one or more bits indicate an SR polling request.

In aspect 5, the method of aspect 1 or aspect 2 further includes that the indication is comprised in a MAC-CE in a PDSCH associated with the one or more PUCCH resources.

In aspect 6, the method of any of aspects 1-5 further includes that the SR is transmitted together with a HARQ codebook.

In aspect 7, the method of any of aspects 1-4 or 6 further includes that the indication is received in a latest DCI triggering HARQ feedback in the one or more PUCCH resources.

In aspect 8, the method of any of aspects 1-4 or 6 further includes that the indication is received in one or more DCI triggering HARQ feedback in the one or more PUCCH resources.

In aspect 9, the method of aspect 8 further includes that the indication is received in each DCI triggering the HARQ feedback in the one or more PUCCH resources.

In aspect 10, the method of any of aspects 1 or 3-9 further includes receiving, from the base station, a configuration of an association of the one or more PUCCHs resource with the SR of one or more logical channels, wherein the UE transmits the SR of the one or more logical channels in the one or more PUCCH resources.

In 11, the method of any of aspects 1, 6, or 10 further includes that the indication comprises an RRC configuration to include the SR in the one or more PUCCH resources.

In aspect 12, the method of any of aspects 1-11, further includes retransmitting a positive SR in each PUCCH resource for HARQ feedback until an uplink grant is received.

In aspect 13, the method of any of aspects 1-11 further includes transmit a negative SR in one or more PUCCH resources for a threshold amount of time following a positive SR.

In aspect 14, the method of any of aspects 9-13 further includes transmitting scheduling request information in each PUCCH resource for HARQ feedback based on the RRC configuration.

In aspect 15, the method of any of aspects 9-13 further includes that the UE transmits the SR to the base station in the one or more PUCCH resources for the HARQ feedback based on the UE having ACK/NACK feedback to transmit in the one or more PUCCH resources.

In aspect 16, the method of any of aspects 9-13 or 15 further includes the UE does not transmit the SR to the base station in a resource in which the UE does not have the ACK/NACK feedback for transmission.

In aspect 17, the method of any of aspects 1-16 further includes receiving a radio resource control (RRC) message configuring one or more of a request period parameter or a request offset parameter for transmission of the SR request in the one or more PUCCH resources for the HARQ feedback.

In aspect 18, the method of any of aspects 1-17 further includes receiving a downlink grant that does not schedule a physical downlink shared channel (PDSCH), wherein the UE transmits the SR in the PUCCH resource for the HARQ feedback triggered by the downlink grant.

In aspect 19, the method of aspect 18 further includes that the downlink grant triggers a type-3 HARQ-ACK feedback.

In aspect 20, the method of any of aspects 1-19 further includes receiving a configuration for SR transmission in non-HARQ PUCCH resources; and transmitting an additional SR in a non-HARQ PUCCH resource based on the configuration.

In aspect 21, the method of aspect 20 further includes that the configuration for the SR transmission in the non-HARQ PUCCH resources has a reduced density based on the SR transmission in HARQ PUCCH resources being enabled for the UE.

In aspect 22, the method of any of aspects 1-19 further includes disabling SR transmission in non-HARQ PUCCH resources based on a configuration enabling the SR transmission in HARQ PUCCH resources.

In aspect 23, the method of any of aspects 1-22 further includes receiving an uplink grant for the SR transmission; and transmitting a buffer status report (BSR) based on the uplink grant.

Aspect 24 is an apparatus for wireless communication at a user equipment (UE), comprising: a memory; and at least one processor coupled to the memory and configured to: receive, from a base station, an indication to transmit a scheduling request (SR); receive a downlink transmission triggering hybrid automatic repeat request (HARQ) feedback in one or more physical uplink control channel (PUCCH) resources; and transmit the SR to the base station in the one or more PUCCH resources for the HARQ feedback.

In aspect 25, the apparatus of aspect 24 further includes that the memory and the at least one processor are further configured to perform the method of any of claims 2-23.

In aspect 26, the apparatus of aspect 24 or aspect 25 further includes a transceiver that is configured to receive the indication and the downlink transmission and to transmit the SR.

Aspect 27 is an apparatus for wireless communication at a user equipment (UE), comprising: means for receiving, from a base station, an indication to transmit a scheduling request (SR); means for receiving a downlink transmission triggering hybrid automatic repeat request (HARQ) feedback in one or more physical uplink control channel (PUCCH) resources; and means for transmitting the SR to the base station in the one or more PUCCH resources for the HARQ feedback.

In aspect 28, the apparatus of aspect 27 further includes that the means further comprise a transceiver.

In aspect 29, the apparatus for wireless communication of aspect 27 or aspect 28, further includes means to perform the method of any of claims 2-23.

Aspect 30 is a non-transitory computer-readable storage medium storing computer executable code at a user equipment (UE), the code when executed by a processor causes the processor to: receive, from a base station, an indication to transmit a scheduling request (SR); receive a downlink transmission triggering hybrid automatic repeat request (HARQ) feedback in one or more physical uplink control channel (PUCCH) resources; and transmit the SR to the base station in the one or more PUCCH resources for the HARQ feedback.

In aspect 31, the computer-readable medium of aspect 30, further includes that the code when executed by the processor causes the processor to perform the method of any of claims 2-23.

Aspect 32 is a method of wireless communication at a network node, comprising: send an indication for a UE to transmit an SR; send a downlink transmission triggering HARQ feedback in one or more PUCCH resources; and receiving the SR for the UE in the one or more PUCCH resources.

In aspect 33 the method of aspect 32 further includes that the indication to transmit the SR further indicates one or more logical channels associated with the SR, wherein the base station receives the SR of the one or more logical channels in the one or more PUCCH resources.

In aspect 34, the method of aspect 32 or 33 further includes that the indication comprises one or more bits in a downlink grant that triggers the HARQ feedback in the one or more PUCCH resources.

In aspect 35, the method of aspect 34 further includes that the one or more bits indicate an SR polling request.

In aspect 36, the method of aspect 32 or 33 further includes that the indication is comprised in a MAC-CE in a PDSCH associated with the one or more PUCCH resources.

In aspect 37, the method of any of aspects 32-36 further includes that the SR is based on one or more bits together with a HARQ codebook.

In aspect 38, the method of any of aspects 32-35 or 37 further includes that the indication is in a latest DCI triggering HARQ feedback in the one or more PUCCH resources.

In aspect 39, the method of any of aspects 32-35 or 37 further includes that the indication is in one or more DCI triggering HARQ feedback in the one or more PUCCH resources.

In aspect 40, the method of any of aspects 32-35, 37, or 39 further includes that the indication is in each DCI triggering the HARQ feedback in the one or more PUCCH resources.

In aspect 41, the method of any of aspects 32-40 further includes performing a first blind decoding of the HARQ feedback based on inclusion of the SR; and performing a second blind decoding of the HARQ feedback based on exclusion of the SR.

In aspect 42, the method of aspect 32 or 34-41 further includes configuring an association of the one or more PUCCHs resource with the SR of one or more logical channels, wherein the network node receives the SR of the one or more logical channels in the one or more PUCCH resources.

In aspect 43, the method of any of aspects 32, 37, 41, or 42 further includes that the indication comprises an RRC configuration to include the SR in the one or more PUCCH resources.

In aspect 44, the method of any of aspects 32-43 further includes receiving a retransmission of a positive SR in each PUCCH resource for HARQ feedback until an uplink grant is transmitted.

In aspect 45, the method of any of aspects 32-43 further includes receiving a negative SR in one or more PUCCH resources for a threshold amount of time following a positive SR.

In aspect 46, the method of any of aspects 32-45 further includes receiving scheduling request information in each PUCCH resource for HARQ feedback based on the RRC configuration.

In aspect 47, the method of any of aspects 32-45 further includes that the network node receives the SR in the one or more PUCCH resources for the HARQ feedback based on the HARQ feedback in the one or more PUCCH resources including ACK/NACK feedback.

In aspect 48, the method of any of aspects 32-45 or 47 further includes the network node does not receive the SR in a resource without the ACK/NACK feedback.

In aspect 49, the method of any of aspects 32-48 further includes sending an RRC message configuring one or more of a request period parameter or a request offset parameter for transmission of the SR in the one or more PUCCH resources for the HARQ feedback.

In aspect 50, the method of any of aspects 32-49 further includes sending a downlink grant that does not schedule a PDSCH, wherein the network node receives the SR in the one or more PUCCH resources for the HARQ feedback triggered by the downlink grant.

In aspect 51, the method of aspect 50 further includes that the downlink grant triggers a type-3 HARQ-ACK feedback.

In aspect 52, the method of any of aspects 32-51 further includes sending a configuration for SR transmission in non-HARQ PUCCH resources; and receiving an additional SR in a non-HARQ PUCCH resource based on the configuration.

In aspect 53, the method of aspect 52 further includes that the configuration for the SR transmission in the non-HARQ PUCCH resources has a reduced density based on the SR transmission in HARQ PUCCH resources being enabled for the UE.

In aspect 54, the method of any of aspects 32-51 further includes disabling SR transmission in non-HARQ PUCCH resources by enabling the SR transmission in HARQ PUCCH resources.

In aspect 55, the method of any of aspects 32-54 further includes sending an uplink grant for the SR transmission; and receiving a BSR based on the uplink grant.

Aspect 56 is an apparatus for wireless communication at a network node, comprising: a memory; and at least one processor coupled to the memory and configured to: send an indication for a UE to transmit an SR; send a downlink transmission triggering HARQ feedback in one or more PUCCH resources; and receive the SR for the UE in the one or more PUCCH resources.

In aspect 57, the apparatus of aspect 56 further includes a transceiver.

In aspect 58, the apparatus of aspect 56 or 57 further includes that the memory and the at least one processor are further configured to perform the method of any of aspects 33-55.

Aspect 59 is an apparatus for wireless communication at a network node, comprising: means for sending an indication for a UE to transmit an SR; means for sending a downlink transmission triggering HARQ feedback in one or more PUCCH resources; and means for receiving the SR for the UE in the one or more PUCCH resources.

In aspect 60, the apparatus of aspect 59 further includes that the means include a transceiver.

In aspect 61, the apparatus of aspect 59 or aspect 60 further includes means to perform the method of any of aspects 33-55.

Aspect 62 is a non-transitory computer-readable storage medium storing computer executable code at a network node, the code when executed by a processor causes the processor to: transmit an indication for a UE to transmit an SR; send a downlink transmission triggering HARQ feedback in one or more PUCCH resources; and receive the SR for the UE in the one or more PUCCH resources.

In aspect 63, the computer-readable medium of aspect 62 further includes that the code when executed by the processor causes the processor to perform the method of any of aspects 33-55.

What is claimed is:

1. An apparatus for wireless communication at a user equipment (UE), comprising:
   memory; and
   at least one processor coupled to the memory and configured to:
   receive, from a base station, an indication to transmit a scheduling request (SR), wherein the indication is based on one of:
      a medium access control-control element (MAC-CE) in a physical downlink shared channel (PDSCH) transmission associated with one or more physical uplink control channel (PUCCH) resources, wherein the MAC-CE indicates a polling request for the UE to transmit the SR,
      multiple downlink control information (DCI) that trigger hybrid automatic repeat request (HARQ) feedback in a PUCCH resource, wherein the indication is indicated in each DCI triggering the HARQ feedback in the PUCCH resource,
      a first radio resource control (RRC) configuration to include the SR in each HARQ PUCCH transmission,
      a second RRC configuration that configures a polling request period parameter and a polling request offset parameter for transmission of an SR polling request in the one or more PUCCH resources for the HARQ feedback that enable the UE to determine whether to transmit the SR in a HARQ PUCCH transmission based on a slot index, the polling request period parameter, and the polling request offset parameter, or
      an uplink grant for an SR transmission in combination with a disablement of SR transmissions in non-HARQ PUCCH resources and an enablement of the SR transmissions in HARQ PUCCH resources;
   receive a downlink transmission triggering the HARQ feedback in the one or more PUCCH resources; and
   transmit the SR to the base station in the one or more PUCCH resources for the HARQ feedback.

2. The apparatus of claim 1, wherein the indication to transmit the SR further indicates one or more logical channels associated with the SR, and wherein to transmit the SR, the at least one processor is configured to transmit the SR of the one or more logical channels in the one or more PUCCH resources.

3. The apparatus of claim 1, wherein each of the multiple DCI include one or more bits in a downlink grant, and wherein the one or more bits indicate the SR polling request that triggers the HARQ feedback in the one or more PUCCH resources.

4. The apparatus of claim 1, wherein the indication is comprised in a header of the MAC-CE in the PDSCH transmission associated with the one or more PUCCH resources, wherein the header includes a value that is dedicated for SR polling.

5. The apparatus of claim 1, wherein the at least one processor is configured to transmit the SR together with a HARQ codebook.

6. The apparatus of claim 1, wherein the indication is in a latest DCI triggering HARQ feedback in the one or more PUCCH resources.

7. The apparatus of claim 1, wherein the indication is indicated by inclusion in each of the multiple DCI triggering the HARQ feedback in the PUCCH resources.

8. The apparatus of claim 1, wherein the at least one processor is further configured to:
   receive, from the base station, a configuration of an association of the one or more PUCCH resources with the SR of one or more logical channels, wherein to transmit the SR, the at least one processor is configured to transmit the SR of the one or more logical channels in the one or more PUCCH resources.

9. The apparatus of claim 8, wherein the indication comprises the first RRC configuration that indicates for the UE to include the SR in each HARQ PUCCH transmission.

10. The apparatus of claim 9, wherein the at least one processor is further configured to perform one or more of:
    retransmit a positive SR in each PUCCH resource for HARQ feedback until an uplink grant reception,
    transmit a negative SR in one or more PUCCH resources for a threshold amount of time following the positive SR, or
    transmit scheduling request information in each PUCCH resource for the HARQ feedback based on the first RRC configuration.

11. The apparatus of claim 9, wherein to transmit the SR, the at least one processor is configured to transmit the SR in the one or more PUCCH resources for the HARQ feedback based on the UE having ACK/NACK feedback to transmit in the one or more PUCCH resources and not to transmit the SR in a resource in which the UE does not have the ACK/NACK feedback for transmission.

12. The apparatus of claim 1, wherein the at least one processor is further configured to perform:
receive the second RRC configuration that indicates the polling request period parameter and the polling request offset parameter that enable the UE to determine whether to transmit the SR in the HARQ PUCCH transmission based on the slot index, the polling request period parameter, and the polling request offset parameter.

13. The apparatus of claim 1, wherein the at least one processor is further configured to perform:
receive a configuration for the SR transmission in the non-HARQ PUCCH resources; and
transmit an additional SR in a non-HARQ PUCCH resource based on the configuration, wherein the configuration for the SR transmission in the non-HARQ PUCCH resources has a reduced density based on the SR transmission in the HARQ PUCCH resources being enabled for the UE.

14. The apparatus of claim 1, wherein the at least one processor is further configured to perform:
receive the disablement for the SR transmissions in the non-HARQ PUCCH resources based on the enablement of the SR transmissions in the HARQ PUCCH resources;
receive the uplink grant for the SR transmission; and
transmit a buffer status report (BSR) based on the combination of the uplink grant and the disablement of the SR transmissions in the non-HARQ PUCCH resources.

15. The apparatus of claim 4, wherein the MAC-CE includes the header that indicates the SR request and does not include additional content.

16. An apparatus for wireless communication at a network node, comprising:
memory; and
at least one processor coupled to the memory and configured to:
send an indication for a user equipment (UE) to transmit a scheduling request (SR), wherein the indication is based on one of:
a medium access control-control element (MAC-CE) in a physical downlink shared channel (PDSCH) transmission associated with one or more physical uplink control channel (PUCCH) resources, wherein the MAC-CE indicates a polling request for the UE to transmit the SR,
multiple downlink control information (DCI) that trigger hybrid automatic repeat request (HARQ) feedback in a PUCCH resource, wherein the indication is indicated in each DCI triggering the HARQ feedback in the PUCCH resource,
a first radio resource control (RRC) configuration to include the SR in each HARQ PUCCH transmission,
a second RRC configuration that configures a polling request period parameter and a polling request offset parameter for transmission of an SR polling request in the one or more PUCCH resources for the HARQ feedback that enable the UE to determine whether to transmit the SR in a HARQ PUCCH transmission based on a slot index, the polling request period parameter, and the polling request offset parameter, or
an uplink grant for an SR transmission in combination with a disablement of SR transmissions in non-HARQ PUCCH resources and an enablement of the SR transmissions in HARQ PUCCH resources;
send a downlink transmission that triggers the HARQ feedback in the one or more PUCCH resources; and
receive the SR for the UE in the one or more PUCCH resources.

17. The apparatus of claim 16, wherein the indication to transmit the SR further indicates one or more logical channels associated with the SR, wherein to receive the SR, the at least one processor is configured to receive the SR of the one or more logical channels in the one or more PUCCH resources.

18. The apparatus of claim 16, wherein each of the multiple DCI include one or more bits in a downlink grant, and wherein the one or more bits indicate the SR polling request that triggers the HARQ feedback in the one or more PUCCH resources.

19. The apparatus of claim 16, wherein the indication is comprised in a header of the MAC-CE in the PDSCH transmission associated with the one or more PUCCH resources, wherein the header includes a value that is dedicated for SR polling.

20. The apparatus of claim 16, wherein the SR is based on one or more bits together with a HARQ codebook.

21. The apparatus of claim 16, wherein the indication is indicated by inclusion in each of the multiple DCI triggering the HARQ feedback in the PUCCH resources.

22. The apparatus of claim 16, wherein the at least one processor is further configured to perform:
perform a first blind decoding of the HARQ feedback based on inclusion of the SR; and
perform a second blind decoding of the HARQ feedback based on exclusion of the SR.

23. The apparatus of claim 16, wherein the at least one processor is further configured to perform:
configure an association of the one or more PUCCH resources with the SR of one or more logical channels, wherein to receive the SR, the at least one processor is configured to receive the SR of the one or more logical channels in the one or more PUCCH resources, wherein the indication comprises the first RRC configuration that indicates for the UE to include the SR in each HARQ PUCCH transmission.

24. The apparatus of claim 23, wherein the at least one processor is further configured to perform one or more of:
receive a retransmission of a positive SR in each PUCCH resource for HARQ feedback until an uplink grant transmission,
receive a negative SR in one or more PUCCH resources for a threshold amount of time following the positive SR,
receive scheduling request information in each PUCCH resource for the HARQ feedback based on the first RRC configuration, or
receive the SR in the one or more PUCCH resources for the HARQ feedback based on the HARQ feedback in the one or more PUCCH resources including ACK/NACK feedback and not to receive the SR in a resource without the ACK/NACK feedback.

25. The apparatus of claim 16, wherein the at least one processor is further configured to:

send the second RRC configuration that indicates the polling request period parameter and the polling request offset parameter that enable the UE to determine whether to transmit the SR in the HARQ PUCCH transmission based on the slot index, the polling request period parameter, and the polling request offset parameter.

26. The apparatus of claim 16, wherein the at least one processor is further configured to perform:
send a configuration for the SR transmission in the non-HARQ PUCCH resources; and
receive an additional SR in a non-HARQ PUCCH resource based on the configuration, wherein the configuration for the SR transmission in the non-HARQ PUCCH resources has a reduced density based on the SR transmission in the HARQ PUCCH resources being enabled for the UE.

27. The apparatus of claim 16, wherein the at least one processor is further configured to perform:
disable the SR transmission in the non-HARQ PUCCH resources based on the enablement of the SR transmission in the HARQ PUCCH resources;
send the uplink grant for the SR transmission; and
receive a buffer status report (BSR) based on the combination of the uplink grant and the disablement of the SR transmissions in the non-HARQ PUCCH resources.

28. The apparatus of claim 19, wherein the MAC-CE includes the header that indicates the SR request and does not include additional content.

29. A method of wireless communication at a user equipment (UE), comprising:
receiving, from a base station, an indication to transmit a scheduling request (SR), wherein the indication is based on one of:
a medium access control-control element (MAC-CE) in a physical downlink shared channel (PDSCH) transmission associated with one or more physical uplink control channel (PUCCH) resources, wherein the MAC-CE indicates a polling request for the UE to transmit the SR,
multiple downlink control information (DCI) that trigger hybrid automatic repeat request (HARQ) feedback in a PUCCH resource, wherein the indication is indicated in each DCI triggering the HARQ feedback in the PUCCH resource,
a first radio resource control (RRC) configuration to include the SR in each HARQ PUCCH transmission,
a second RRC configuration that configures a polling request period parameter and a polling request offset parameter for transmission of an SR polling request in the one or more PUCCH resources for the HARQ feedback that enable the UE to determine whether to transmit the SR in a HARQ PUCCH transmission based on a slot index, the polling request period parameter, and the polling request offset parameter, or
an uplink grant for an SR transmission in combination with a disablement of SR transmissions in non-HARQ PUCCH resources and an enablement of the SR transmissions in HARQ PUCCH resources;
receiving a downlink transmission triggering the HARQ feedback in the one or more PUCCH resources; and
transmitting the SR to the base station in the one or more PUCCH resources for the HARQ feedback.

30. A method of wireless communication at a network node, comprising:
transmitting, to a user equipment (UE), an indication to transmit a scheduling request (SR), wherein the indication is based on one of:
a medium access control-control element (MAC-CE) in a physical downlink shared channel (PDSCH) transmission associated with one or more physical uplink control channel (PUCCH) resources, wherein the MAC-CE indicates a polling request for the UE to transmit the SR,
multiple downlink control information (DCI) that trigger hybrid automatic repeat request (HARQ) feedback in a PUCCH resource, wherein the indication is indicated in each DCI triggering the HARQ feedback in the PUCCH resource,
a first radio resource control (RRC) configuration to include the SR in each HARQ PUCCH transmission,
a second RRC configuration that configures a polling request period parameter and a polling request offset parameter for transmission of an SR polling request in the one or more PUCCH resources for the HARQ feedback that enable the UE to determine whether to transmit the SR in a HARQ PUCCH transmission based on a slot index, the polling request period parameter, and the polling request offset parameter, or
an uplink grant for an SR transmission in combination with a disablement of SR transmissions in non-HARQ PUCCH resources and an enablement of the SR transmissions in HARQ PUCCH resources;
transmitting a downlink transmission that triggers the HARQ feedback in the one or more PUCCH resources; and
receiving the SR from the UE in the one or more PUCCH resources.

* * * * *